(12) United States Patent
Raghavan et al.

(10) Patent No.: US 11,540,273 B2
(45) Date of Patent: Dec. 27, 2022

(54) TECHNIQUES FOR INDICATING BEAM SWITCHING CAPABILITY

(71) Applicant: QUALCOMM Incorporated, San Diego, CA (US)

(72) Inventors: Vasanthan Raghavan, West Windsor Township, NJ (US); Sony Akkarakaran, Poway, CA (US); Kang Yang, San Diego, CA (US); Shrenik Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/217,896

(22) Filed: Mar. 30, 2021

(65) Prior Publication Data

US 2022/0322317 A1    Oct. 6, 2022

(51) Int. Cl.
*H04W 72/04*        (2009.01)
*H04W 72/14*        (2009.01)

(52) U.S. Cl.
CPC ....... *H04W 72/044* (2013.01); *H04W 72/048* (2013.01); *H04W 72/14* (2013.01)

(58) Field of Classification Search
CPC .. H04W 72/044; H04W 72/048; H04W 72/14
See application file for complete search history.

(56) References Cited

U.S. PATENT DOCUMENTS

| | | | |
|---|---|---|---|
| 2018/0063693 A1 | 3/2018 | Chakraborty et al. | |
| 2018/0278309 A1 | 9/2018 | Raghavan et al. | |
| 2019/0394634 A1* | 12/2019 | Akkarakaran | ....... H04B 7/0617 |

(Continued)

OTHER PUBLICATIONS

"3rd Generation Partnership Project; Technical Specification Group Radio Access Network; NR; Radio Resource Control (RRC) protocol specification (Release 16)", 3GPP Standard; Technical Specification; 3GPP TS 38.331, 3rd Generation Partnership Project (3GPP), Mobile Competence Centre, 650, Route Des Lucioles, F-06921, Sophia-Antipolis Cedex, France, vol. RAN WG2, No. V16.3.1, Jan. 7, 2021 (Jan. 7, 2021), pp. 1-929, XP051999705, Retrieved from the Internet: URL: https://ftp.3gpp.org/Specs/archive/38_series/38.331/38331-g31.zip38331-g31.docx [retrieved on Jan. 7, 2021] paragraph [05.8], Section 5.8.9, Section 6.6.

(Continued)

*Primary Examiner* — Kashif Siddiqui
(74) *Attorney, Agent, or Firm* — Holland & Hart LLP

(57) ABSTRACT

Methods, systems, and devices for wireless communications are described. A first wireless device may transmit, to a second wireless device, capability control signaling indicating a first quantity of beam switches is supported within a first time period for a first antenna subarray, a first antenna module, or both, of the first wireless device. The first wireless device may receive, from the second wireless device in accordance with the capability control signaling, a grant scheduling one or more messages and indicating a set of beams of the first wireless device over which to communicate the one or more messages in respective transmission time intervals (TTIs) of the first time period. The first wireless device may then transmit or receive, over the first time period using the first antenna subarray, the first antenna module, or both, the one or more messages using the set of beams.

30 Claims, 16 Drawing Sheets

(56) References Cited

U.S. PATENT DOCUMENTS

2020/0053767 A1* 2/2020 Bai .................. H04B 7/0695
2021/0337530 A1* 10/2021 Raghavan ........... H04W 72/048

OTHER PUBLICATIONS

Apple Inc: "A Discussion on Physical Layer Design for NR between 52.6GHz and 71GHz", R1-2008457, 3GPP TSG RAN WG1 #103-e, 3GPP, Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 17, 2020, XP051940157, 32 Pages, URL: https://ftp.3gpp.org/tsg_ran/WG1_RL1/TSGR1_103-e/Docs/R1-2008457 .zip R1-2008457, A Discussion on Physical Layer Design for NR between 52.6GHz and 71 GHz.docx.

International Search Report and Written Opinion—PCT/US2022/070430—ISA/EPO—dated Jul. 1, 2022 (2102645WO).

Moderator (Interdigital Inc), et al., "Discussion Summary of [104-e-NR-52-71GHz-04]", 3GPP TSG RAN WG1 #104-e, R1-2101895, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 33 Pages, Jan. 27, 2021, XP051975975, URL: https://ftp.3gpp.org/tsg_ran/WG1_RL1/TSGR1_104-e/Docs/R1-2101895.zip R1-2101895_Discussion Summary of Beam management for new SCSs.docx.

* cited by examiner

TECHNIQUES FOR INDICATING BEAM SWITCHING CAPABILITY

FIELD OF TECHNOLOGY

The following relates to wireless communications, including techniques for indicating beam switching capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless devices (e.g., UEs) may be able to perform communications with multiple beams which are generated using one or more antenna modules and/or one or more antenna subarrays. When performing a beam switching procedure to switch from one beam to another, there may be some settling time to retune radio frequency (RF) components to ensure that communications performed using the new beam weights exhibit stable phases and amplitudes. As such, RF settling times, as well as other factors, for beamformed communications are not appropriately managed in conventional systems.

SUMMARY

The described techniques relate to improved methods, systems, devices, and apparatuses that support techniques for indicating beam switching capability. Generally, the described techniques provide for reporting beam switching capabilities at a wireless device (e.g., user equipment (UE)). In particular, the aspects of the present disclosure provide techniques for reporting beam switching capabilities supported by a wireless device with a finer granularity, including a per-antenna module basis, and a per-antenna subarray basis. For example, a wireless device may transmit capability control signaling indicating a maximum quantity of beam switches which may be performed by a specific antenna module and/or specific antenna subarray of the wireless device. The capability control signaling may additionally include a time period (e.g., quantity of symbols) over which the maximum quantity of beam switches may be performed. Subsequently, the wireless device may receive a grant which schedules messages over the time period in accordance with the reported quantity of supported beam switches, and may transmit/receive the messages using a set of beams indicated in the grant.

A method for wireless communication at a first wireless device is described. The method may include transmitting, to a second wireless device, capability control signaling indicating a first quantity of beam switches is supported within a first time period for a first antenna subarray, a first antenna module, or both, of the first wireless device, receiving, from the second wireless device in accordance with the capability control signaling, a grant scheduling one or more messages and indicating a set of multiple beams of the first wireless device over which to communicate the one or more messages in respective transmission time intervals of the first time period, and transmitting or receiving, over the first time period using the first antenna subarray, the first antenna module, or both, the one or more messages using the set of multiple beams.

An apparatus for wireless communication at a first wireless device is described. The apparatus may include a processor, memory coupled with the processor, and instructions stored in the memory. The instructions may be executable by the processor to cause the apparatus to transmit, to a second wireless device, capability control signaling indicating a first quantity of beam switches is supported within a first time period for a first antenna subarray, a first antenna module, or both, of the first wireless device, receive, from the second wireless device in accordance with the capability control signaling, a grant scheduling one or more messages and indicating a set of multiple beams of the first wireless device over which to communicate the one or more messages in respective transmission time intervals of the first time period, and transmit or receive, over the first time period using the first antenna subarray, the first antenna module, or both, the one or more messages using the set of multiple beams.

Another apparatus for wireless communication at a first wireless device is described. The apparatus may include means for transmitting, to a second wireless device, capability control signaling indicating a first quantity of beam switches is supported within a first time period for a first antenna subarray, a first antenna module, or both, of the first wireless device, means for receiving, from the second wireless device in accordance with the capability control signaling, a grant scheduling one or more messages and indicating a set of multiple beams of the first wireless device over which to communicate the one or more messages in respective transmission time intervals of the first time period, and means for transmitting or receiving, over the first time period using the first antenna subarray, the first antenna module, or both, the one or more messages using the set of multiple beams.

A non-transitory computer-readable medium storing code for wireless communication at a first wireless device is described. The code may include instructions executable by a processor to transmit, to a second wireless device, capability control signaling indicating a first quantity of beam switches is supported within a first time period for a first antenna subarray, a first antenna module, or both, of the first wireless device, receive, from the second wireless device in accordance with the capability control signaling, a grant scheduling one or more messages and indicating a set of multiple beams of the first wireless device over which to communicate the one or more messages in respective transmission time intervals of the first time period, and transmit or receive, over the first time period using the first antenna subarray, the first antenna module, or both, the one or more messages using the set of multiple beams.

In some examples of the method, apparatuses, and non-transitory computer-readable medium described herein, transmitting the capability control signaling may include operations, features, means, or instructions for transmitting the capability control signaling indicating a second quantity of beam switches supported within a second time period for a second antenna subarray, a second antenna module, or both, of the first wireless device, where the grant schedules the one or more messages within the first time period and the second time period.

In some examples of the method, apparatuses, and non-transitory computer-readable medium described herein, transmitting or receiving the one or more messages may include operations, features, means, or instructions for transmitting or receiving a first subset of the one or more messages within the first time period using a first set of beams of the set of multiple beams generated via the first antenna subarray, the first antenna module, or both and transmitting or receiving a second subset of the one or more messages within the second time period using a second set of beams of the set of multiple beams generated via the second antenna subarray, the second antenna module, or both.

In some examples of the method, apparatuses, and non-transitory computer-readable medium described herein, receiving the grant may include operations, features, means, or instructions for receiving the grant indicating the first set of beams, the second set of beams, or both.

In some examples of the method, apparatuses, and non-transitory computer-readable medium described herein, transmitting the capability control signaling may include operations, features, means, or instructions for transmitting the capability control signaling indicating a quantity of antenna subarray switches, a quantity of antenna module switches, or both, supported by the first wireless device within the first time period, where the grant may be based on the quantity of antenna subarray switches, the quantity of antenna module switches, or both.

In some examples of the method, apparatuses, and non-transitory computer-readable medium described herein, transmitting the capability control signaling may include operations, features, means, or instructions for transmitting the capability control signaling indicating the first quantity of beam switches supported within the first time period for a set of multiple antenna subarrays of the first wireless device, the set of multiple antenna subarrays including the first antenna subarray.

In some examples of the method, apparatuses, and non-transitory computer-readable medium described herein, the set of multiple antenna subarrays may be associated with a single antenna module of the first wireless device, a set of multiple antenna modules of the first wireless device, or both.

In some examples of the method, apparatuses, and non-transitory computer-readable medium described herein, transmitting the capability control signaling may include operations, features, means, or instructions for transmitting the capability control signaling indicating the set of multiple beams supported by the first quantity of beam switches within the first time period for the first antenna subarray, the first antenna module, or both.

In some examples of the method, apparatuses, and non-transitory computer-readable medium described herein, transmitting the capability control signaling may include operations, features, means, or instructions for transmitting the capability control signaling indicating a second quantity of beams supported by a second quantity of beam switches within the first time period for the first antenna subarray, the first antenna module, or both.

In some examples of the method, apparatuses, and non-transitory computer-readable medium described herein, transmitting the capability control signaling may include operations, features, means, or instructions for transmitting the capability control signaling indicating one or more beam switch permutations associated with the set of multiple beams, where the grant schedules the one or more messages in accordance with the one or more beam switch permutations.

In some examples of the method, apparatuses, and non-transitory computer-readable medium described herein, transmitting the capability control signaling may include operations, features, means, or instructions for transmitting the capability control signaling indicating one or more parameters associated with the set of multiple beams including an angular distance between the set of multiple beams, radio frequency (RF) components associated with the set of multiple beams, beamwidths associated with the set of multiple beams, a quantity of antenna elements associated with the set of multiple beams, or any combination thereof, where the grant schedules the one or more messages in accordance with the one or more parameters.

In some examples of the method, apparatuses, and non-transitory computer-readable medium described herein, the first wireless device includes a set of multiple antenna modules including the first antenna module, each antenna module includes a set of multiple antenna subarrays, and, and each antenna subarray includes one or more antenna elements.

In some examples of the method, apparatuses, and non-transitory computer-readable medium described herein, the capability control signaling includes Layer 1 (L1) signaling, Layer 2 (L2) signaling, radio resource control (RRC) signaling, or any combination thereof.

In some examples of the method, apparatuses, and non-transitory computer-readable medium described herein, and the method, apparatuses, and non-transitory computer-readable medium may include further operations, features, means, or instructions for where the first wireless device includes one of a UE, a customer premises equipment (CPE), or a first integrated access and backhaul (IAB) node and where the second wireless device includes one of a base station or a second IAB node.

A method for wireless communication at a second wireless device is described. The method may include receiving, from a first wireless device, capability control signaling indicating a first quantity of beam switches is supported within a first time period for a first antenna subarray, a first antenna module, or both, of the first wireless device, transmitting, to the first wireless device in accordance with the capability control signaling, a grant scheduling one or more messages and indicating a set of multiple beams of the first wireless device over which to communicate the one or more messages in respective transmission time intervals of the first time period, and transmitting or receiving the one or more messages with the first wireless device over the first time period in accordance with the grant.

An apparatus for wireless communication at a second wireless device is described. The apparatus may include a processor, memory coupled with the processor, and instructions stored in the memory. The instructions may be executable by the processor to cause the apparatus to receive, from a first wireless device, capability control signaling indicating a first quantity of beam switches is supported within a first time period for a first antenna subarray, a first antenna module, or both, of the first wireless device, transmit, to the first wireless device in accordance with the capability control signaling, a grant scheduling one or more messages and indicating a set of multiple beams of the first wireless device over which to communicate the one or more messages in respective transmission time intervals of the first time period, and transmit or receive the one or more messages with the first wireless device over the first time period in accordance with the grant.

Another apparatus for wireless communication at a second wireless device is described. The apparatus may include means for receiving, from a first wireless device, capability control signaling indicating a first quantity of beam switches is supported within a first time period for a first antenna subarray, a first antenna module, or both, of the first wireless device, means for transmitting, to the first wireless device in accordance with the capability control signaling, a grant scheduling one or more messages and indicating a set of multiple beams of the first wireless device over which to communicate the one or more messages in respective transmission time intervals of the first time period, and means for transmitting or receiving the one or more messages with the first wireless device over the first time period in accordance with the grant.

A non-transitory computer-readable medium storing code for wireless communication at a second wireless device is described. The code may include instructions executable by a processor to receive, from a first wireless device, capability control signaling indicating a first quantity of beam switches is supported within a first time period for a first antenna subarray, a first antenna module, or both, of the first wireless device, transmit, to the first wireless device in accordance with the capability control signaling, a grant scheduling one or more messages and indicating a set of multiple beams of the first wireless device over which to communicate the one or more messages in respective transmission time intervals of the first time period, and transmit or receive the one or more messages with the first wireless device over the first time period in accordance with the grant.

In some examples of the method, apparatuses, and non-transitory computer-readable medium described herein, receiving the capability control signaling may include operations, features, means, or instructions for receiving the capability control signaling indicating a second quantity of beam switches supported within a second time period for a second antenna subarray, a second antenna module, or both, of the first wireless device, where the grant schedules the one or more messages within the first time period and the second time period.

In some examples of the method, apparatuses, and non-transitory computer-readable medium described herein, transmitting or receiving the one or more messages may include operations, features, means, or instructions for transmitting or receiving a first subset of the one or more messages within the first time period based on a first set of beams of the set of multiple beams generated by the first wireless device via the first antenna subarray, the first antenna module, or both and transmitting or receiving a second subset of the one or more messages within the second time period based on a second set of beams of the set of multiple beams generated by the first wireless device via the second antenna subarray, the second antenna module, or both.

In some examples of the method, apparatuses, and non-transitory computer-readable medium described herein, transmitting the grant may include operations, features, means, or instructions for transmitting the grant indicating the first set of beams, the second set of beams, or both.

In some examples of the method, apparatuses, and non-transitory computer-readable medium described herein, receiving the capability control signaling may include operations, features, means, or instructions for receiving the capability control signaling indicating a quantity of antenna subarray switches, a quantity of antenna module switches, or both, supported by the first wireless device within the first time period, where the grant may be based on the quantity of antenna subarray switches, the quantity of antenna module switches, or both.

In some examples of the method, apparatuses, and non-transitory computer-readable medium described herein, receiving the capability control signaling may include operations, features, means, or instructions for receiving the capability control signaling indicating the first quantity of beam switches supported within the first time period for a set of multiple antenna subarrays of the first wireless device, the set of multiple antenna subarrays including the first antenna subarray.

In some examples of the method, apparatuses, and non-transitory computer-readable medium described herein, the set of multiple antenna subarrays may be associated with a single antenna module of the first wireless device, a set of multiple antenna modules of the first wireless device, or both.

In some examples of the method, apparatuses, and non-transitory computer-readable medium described herein, receiving the capability control signaling may include operations, features, means, or instructions for receiving the capability control signaling indicating the set of multiple beams supported by the first quantity of beam switches within the first time period for the first antenna subarray, the first antenna module, or both.

In some examples of the method, apparatuses, and non-transitory computer-readable medium described herein, receiving the capability control signaling may include operations, features, means, or instructions for receiving the capability control signaling indicating a second quantity of beams supported by a second quantity of beam switches within the first time period for the first antenna subarray, the first antenna module, or both.

In some examples of the method, apparatuses, and non-transitory computer-readable medium described herein, receiving the capability control signaling may include operations, features, means, or instructions for receiving the capability control signaling indicating one or more beam switch permutations associated with the set of multiple beams, where the grant schedules the one or more messages in accordance with the one or more beam switch permutations.

In some examples of the method, apparatuses, and non-transitory computer-readable medium described herein, receiving the capability control signaling may include operations, features, means, or instructions for receiving the capability control signaling indicating one or more parameters associated with the set of multiple beams including an angular distance between the set of multiple beams, RF components associated with the set of multiple beams, beamwidths associated with the set of multiple beams, a quantity of antenna elements associated with the set of multiple beams, or any combination thereof, where the grant schedules the one or more messages in accordance with the one or more parameters.

In some examples of the method, apparatuses, and non-transitory computer-readable medium described herein, the first wireless device includes a set of multiple antenna modules including the first antenna module, each antenna module includes a set of multiple antenna subarrays, and, and each antenna subarray includes one or more antenna elements.

In some examples of the method, apparatuses, and non-transitory computer-readable medium described herein, the capability control signaling includes L1 signaling, L2 signaling, RRC signaling, or any combination thereof.

In some examples of the method, apparatuses, and non-transitory computer-readable medium described herein, and the method, apparatuses, and non-transitory computer-readable medium may include further operations, features, means, or instructions for where the first wireless device includes one of a UE, a CPE, or a first IAB node and where the second wireless device includes one of a base station or a second IAB node.

DETAILED DESCRIPTION

Figure 1:
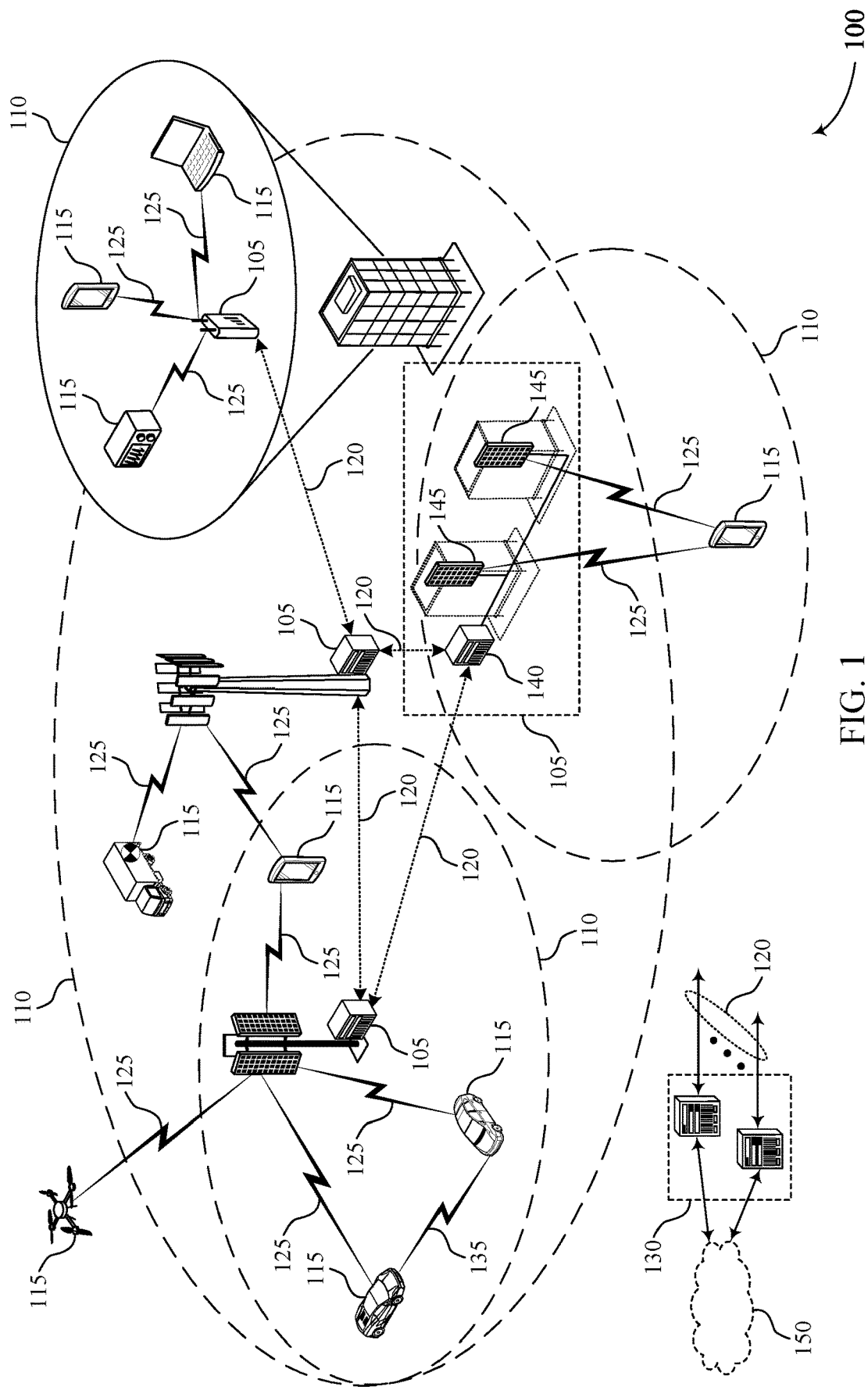
FIG. 1 illustrates an example of a wireless communications system that supports techniques for indicating beam switching capability in accordance with aspects of the present disclosure.

Some wireless devices (e.g., user equipments (UEs)) may be able to perform communications with multiple beams which are generated using one or more antenna modules and/or one or more antenna subarrays within each antenna module. When performing a beam switching procedure to switch from one beam to another, there may be some settling time to retune radio frequency (RF) components to ensure that communications performed using the new beam weights exhibit stable phases and amplitudes. As such, RF settling times, as well as other factors, may impose a limit on a quantity of beam switches a wireless device may perform within a given timeframe.

Some wireless communications systems enable UEs to report a capability for a maximum quantity of beam switches the respective UEs can perform within a given time period. However, current wireless communications systems may enable UEs to report only a single quantity of supported beam switches. This high-level granularity for capability reporting may be insufficient in some instances. In particular, UEs configured to communicate within higher frequency bands (e.g., mmW bands, Frequency Range 4 (FR4) and beyond) may be configured with multiple antenna modules each including multiple antenna subarrays. In such cases, current capability reporting may be unable to effectively and efficiently report beam switching capabilities for the individual antenna modules and/or individual antenna subarrays.

Accordingly, aspects of the present disclosure provide techniques for reporting beam switching capabilities at a wireless device (e.g., UE). In particular, aspects of the present disclosure support techniques for reporting beam switching capabilities supported by a UE with a finer granularity, including a per-antenna module basis, and a per-antenna subarray basis. For example, a UE may transmit capability control signaling indicating a maximum quantity of beam switches which may be performed by a specific antenna module and/or specific antenna subarray of the UE. The capability control signaling may additionally include a time period (e.g., quantity of symbols) over which the maximum quantity of beam switches may be performed. Subsequently, the UE may receive a grant which schedules messages over the time period in accordance with the reported quantity of supported beam switches, and the UE may transmit/receive the messages using a set of beams indicated in the grant.

In some implementations, the UE may report quantities of supported beam switches on a per-antenna module basis, a per-antenna element basis, for sets of antenna modules, for sets of antenna subarrays, or any combination thereof. Additionally, or alternatively, the UE may report how many times it may switch between antenna modules (e.g., quantity of antenna module switches) and/or between antenna subarrays (e.g., quantity of subarray switches) within a given time period. In some cases, the UE may report how many beam switches which may be performed within specific sets of beams (e.g., beam switch permutations). For example, a UE may support five beam switches within a slot between beams A-E, but may support only three beam switches within a slot between beams F-J.

Aspects of the disclosure are initially described in the context of wireless communications systems. Additional aspects of the disclosure are described in the context of an example resource configuration and an example process flow Aspects of the disclosure are further illustrated by and described with reference to apparatus diagrams, system diagrams, and flowcharts that relate to techniques for indicating beam switching capability.

FIG. 1 illustrates an example of a wireless communications system 100 that supports techniques for indicating beam switching capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay/repeater devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The base stations 105, UEs 115, and other wireless devices (e.g., IAB nodes, customer premises equipments (CPEs)) of the wireless communications system 100 may support techniques for reporting beam switching capabilities at the respective wireless devices. In particular, the wireless communications system 100 may be configured to support techniques for reporting beam switching capabilities supported by a wireless device (e.g., UE 115, IAB node, CPE) with a finer granularity, including a per-antenna module basis, and a per-antenna subarray basis.

For example, a UE 115 of the wireless communications system 100 may transmit capability control signaling to a base station 105, where the capability control signaling indicates a maximum quantity of beam switches which may be performed by a specific antenna module and/or specific antenna subarray of the UE 115. The capability control signaling may additionally include a time period (e.g., quantity of symbols) over which the maximum quantity of beam switches may be performed. Subsequently, the UE 115 may receive a grant from the base station 105 which schedules messages over the time period in accordance with the reported quantity of supported beam switches, and may transmit/receive the messages using a set of beams indicated in the grant.

In some implementations, the UE 115 may report quantities of supported beam switches on a per-antenna module basis, a per-antenna element basis, for sets of antenna modules, for sets of antenna subarrays, or any combination thereof. Additionally, or alternatively, the UE 115 may report how many times it may switch between antenna modules (e.g., quantity of antenna module switches) and/or between antenna subarrays (e.g., quantity of subarray switches) within a given time period. In some cases, the UE 115 may report how many beam switches which may be performed within specific sets of beams (e.g., beam switch permutations). For example, the UE 115 may support five beam switches within a slot between beams A-E, but may support only three beam switches within a slot between beams F-H.

Techniques described herein may enable UEs 115 to report multiple beam switching capabilities with a finer granularity, such as on a per-antenna module basis and/or a per-antenna subarray basis. Enabling UEs 115 to report multiple beam switching capabilities at a finer granularity may enable the network (e.g., base stations 105) to schedule communications at the UEs 115 over beams and time periods which account for individual RF settling times and beam switching times at the respective antenna modules and/or antenna arrays of the UEs 115. As such, techniques described herein may enable the network to schedule communications at the UE 115 which are tailored to the specific beam switching capabilities of the UE 115, which may lead to a more efficient use of resources, reduced latency of communications at the UEs 115, and higher throughput.

Figure 2:
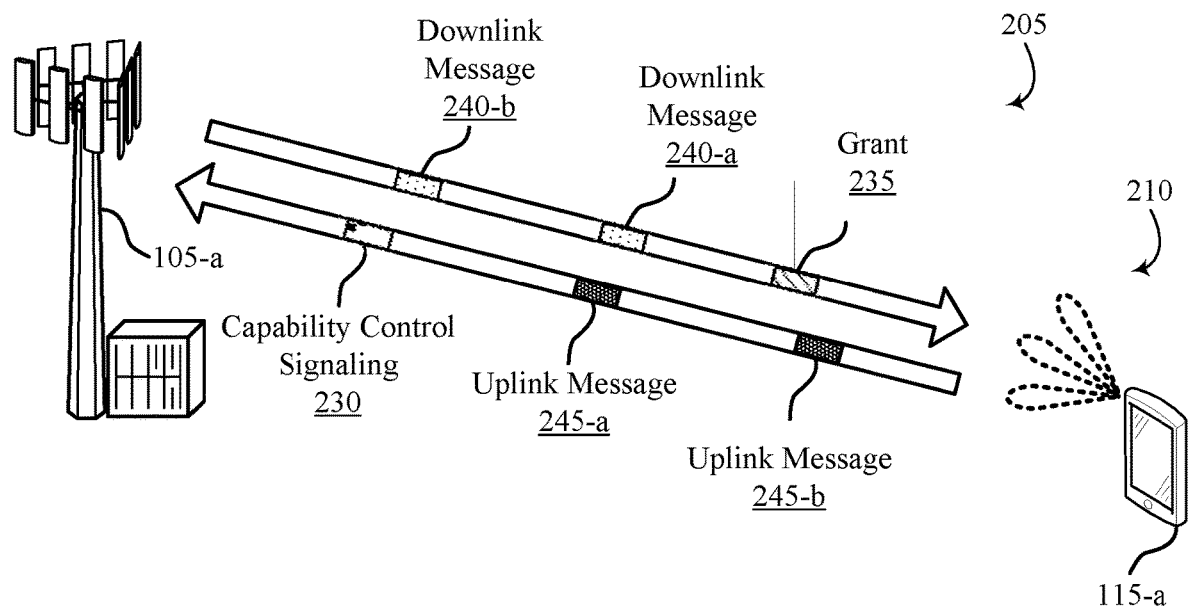
FIG. 2 illustrates an example of a wireless communications system that supports techniques for indicating beam switching capability in accordance with aspects of the present disclosure.
Figure 2:
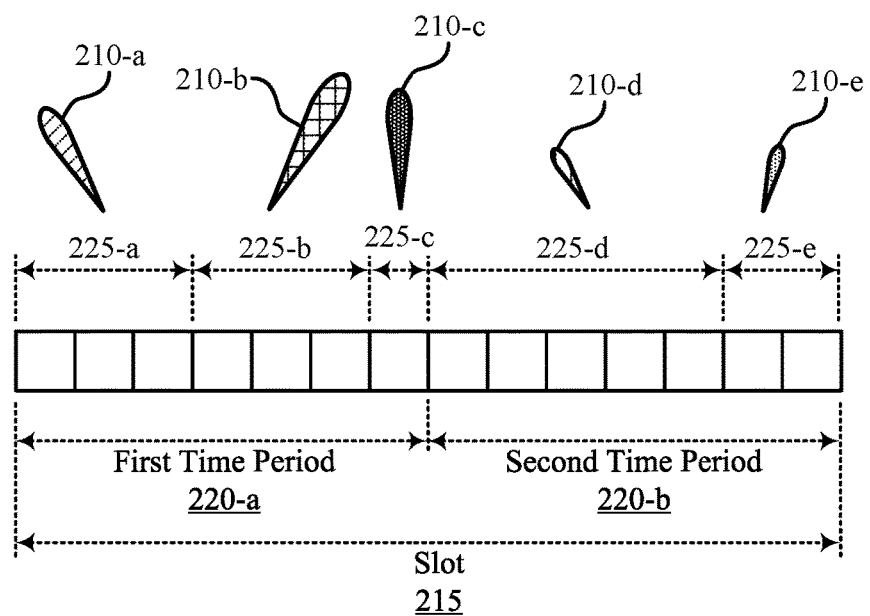

FIG. 2 illustrates an example of a wireless communications system 200 that supports techniques for indicating beam switching capability in accordance with aspects of the present disclosure. Aspects of the wireless communications system 200 may implement, or be implemented by, aspects of the wireless communications system 100. The base station 105-a and the UE 115-a of the wireless communications system 200 may support signaling and techniques for reporting beam switching capabilities at the UE 115-a.

The wireless communications system 200 may include a base station 105-a and a UE 115-a, which may be examples of UEs 115, base stations 105, and other wireless devices as described with reference to FIG. 1. In some aspects, the UE 115-a may communicate with the base station 105-a using a communication link 205, which may be an example of an NR or LTE link between the base station 105-a and the UE 115-a. In some aspects, communication link 205 may include an example of an access link (e.g., Uu link) which may include bi-directional links that enable both uplink and downlink communication. For example, the UE 115-a may transmit uplink signals, such as uplink control signals or uplink data signals, to the base station 105-a using the communication link 205, and the base station 105-a may transmit downlink signals, such as downlink control signals or downlink data signals, to the UE 115-a using the communication link 205.

While wireless communications system 200 is shown and described as including a base station 105-a and a UE 115-a, these wireless devices are provided solely by way of example. The signaling and other operations performed by the base station 105-a and the UE 115-a of the wireless communications system 200 may be performed by any wireless device, including IAB nodes, CPEs, repeater nodes, relay nodes, intelligent reflective surface (IRS) nodes, and the like. For example, in some cases, the operations/signaling performed by the UE 115-a may be performed by an IAB node, a CPE, or both. Similarly, in some cases, the operations/signaling performed by the base station 105-a may be performed by an IAB node.

In some aspects, the UE 115-a and the base station 105-a may communicate with one another using one or more beams 210, one or more carriers, one or more communications links, or any combination thereof. For example, as shown in FIG. 2, the UE 115-a may be configured to generate a set of beams 210 via one or more antenna modules and/or one or more antenna subarrays, where the beams 210 may facilitate wireless communications with the base station 105.

The UE 115-a may include one or more antenna modules, where each antenna module includes an antenna array including a set of antenna elements (e.g., 4×4 array of antenna elements). Each antenna array may include multiple antenna subarrays, where each antenna subarray includes one or more antenna elements that are subsets of antenna elements of the antenna array. For example, an antenna module including a 4×4 antenna array may include four different 1×4 antenna subarrays, four different 4×1 antenna subarrays, and multiple other antenna subarrays. At higher carrier frequencies, antenna subarrays within an antenna module may be controlled by one or more RF integrated circuits (RFICs). Comparatively, antenna subarrays across antenna modules may be controlled by multiple RFICs. For example, an 8×2 dual-polarized antenna array at 60 GHz may be associated with 2 RFICs with 16 single-polarization antenna elements per RFIC. In some aspects, the respective antenna arrays and antenna subarrays may be used to generate the respective beams 210 for communications at the UE 115-a. Generally, beam 210 switches within an antenna subarray or across antenna subarrays within an antenna module may be easier to realize from an RF circuitry design perspective (e.g., for power or area on the chip reasons) as compared to beam 210 switches across antenna subarrays which are also across antenna modules.

As noted previously herein, when performing a beam switching procedure to switch from one beam 210 to another, there may be some settling time to retune RF components (e.g., RF circuitry) to ensure that communications performed using the new beam 210 exhibit stable phases and amplitudes (e.g., stable beam weights) across the entire Tx/Rx path. Some wireless communications systems may define gross requirements on RF settling times for respective frequency ranges (e.g., FR2). As such, RF settling times, as well as other factors, may impose a limit on a quantity of beam switches a wireless device may perform within a given timeframe. In this regard, quantities of beam switches which are supported in a given time period are an indirect reflection of RF settling time, or how fast RF circuitry may settle down transients.

Some wireless communications systems enable UEs to report a capability for a maximum quantity of beam switches the respective UEs can perform within a given time period. However, current wireless communications systems may enable UEs 115 to report only a single quantity of supported beam switches. For example, in some wireless communications systems 100, a UE 115 may be able to report maxNumberRxTxBeamSwitchDL, which defines the maximum number of Tx and Rx beam changes the UE 115 may perform within a slot across all configured serving cells (e.g., defines the maximum number of beam switches which may be performed within a slot). In such cases, the UE 115 may report one value for each subcarrier spacing (SCS) supported by the UE 115.

This high-level granularity for capability reporting may be insufficient in some instances. In particular, UEs configured to communicate within higher frequency bands (e.g., upper mmW bands, sub-THz bands, FR2X, FR4 and beyond) may be configured with multiple antenna modules each including multiple antenna subarrays. At these higher frequencies, transients become dominant, which may lead to longer RF settling times (relative to symbol duration). In such cases, current capability reporting may be unable to effectively report beam switching capabilities for the individual antenna modules and/or individual antenna subarrays.

In order to improve beam switching capabilities and scheduling based on beam switching capabilities supported by the UE 115-a, the UE 115-a and the base station 105-a of the wireless communications system 100 may support techniques for reporting beam switching capabilities at the UE 115-a. In particular, the wireless communications system 100 may support techniques for reporting beam switching capabilities supported by a UE with a finer granularity, including a per-antenna module basis, and a per-antenna subarray basis.

The UE 115-a and the base station 105-a may be configured to support wireless communication at higher frequencies, including mmW bands and FR4. At these higher frequencies, antenna selection (e.g., antenna module selection, antenna subarray selection) over different symbols, slots, or other time periods may be used to optimize power-performance tradeoffs at the UE 115-a. In particular, RF settling times may be different across different antenna modules and/or different subarrays. For example, a first antenna subarray of the UE 115-a may be able to perform three beam switches per slot, whereas a second antenna subarray may be configured to perform only two beam switches per slot.

As such, techniques described herein may enable the UE 115-a to dynamically switch between antenna modules and/or antenna subarrays, and to report beam switching capabilities on a per-antenna module basis and/or per-antenna subarray basis, which may enable improved scheduling of communications at the UE 115-a. In this regard, techniques described herein may enable dynamic subarray switches within a given time period (e.g., within a given slot).

In particular, techniques described herein may enable the UE 115-a to report beam switching capabilities associated with different beam switching configurations, including: (1) a first beam switching configuration in which the UE 115-a switches beams across a fixed antenna subarray used over an entire slot 215, (2) a second beam switching configuration in which the UE 115-a switches beams 210 across antenna subarrays over the slot 215, where the antenna subarrays are limited within a single antenna module switches (which may be controlled by one or more RFICs), and (3) a third beam switching configuration in which the UE 115-a switches beams 210 across antenna subarrays over the slot 215, where the antenna subarrays are associated with multiple antenna modules (which may be controlled by multiple RFICs).

From an RF circuitry design perspective, for the same quantity of beam switches, the first beam switching configuration and the third beam switching configuration described above may provide the lowest and highest levels of complexity, respectively, whereas the second beam switching configuration described above may provide an intermediate level of complexity. In other words, it may be easier to perform beam switching procedures between beams 210 generated by the same antenna array and/or same antenna module, and harder to perform beam switching procedures between beams 210 generated by different antenna arrays and/or different antenna modules. Moreover, the first beam switching configuration described above may exhibit improved power-performance tradeoff advantages over the second and third beam switching configurations. In particular, the first beam switching configuration may prevent the need to switch intermediate frequency (IF) ports from symbol to symbol, which could minimize a contribution of IF integrated circuits (IFICs) to RF settling times. Additionally, the first beam switching configuration may prevent the need to wake up other RFICs (if they are in retention/standby), which may help reduce power consumption at the UE 115-a.

For example, the UE 115-a may transmit capability control signaling 230 to the base station 105-a, where the capability control signaling 230 indicates one or more capabilities associated with beam switching, antenna module switching, and/or antenna array switching at the UE 115-a. In some aspects, the capability control signaling 230 may include L1 signaling, L2 signaling, RRC signaling, or any combination thereof. In some aspects, the UE 115-a may transmit the capability control signaling during an access procedure (e.g., access setting), or via another UE 115 (e.g., relay UE 115) in a sidelink setting. Moreover, the UE 115-a may transmit the capability control signaling proactively (e.g., without a request from the base station 105-a), reactively (e.g., in response to a request from the base station 105-b), or both.

As noted previously herein, the capability control signaling 230 may indicate a quantity of beam switches that the UE 115-a may support for different granularities. In particular, the capability control signaling 230 may indicate a quantity of beam switches supported for individual antenna subarrays (e.g., a per-antenna subarray basis), for groups of antenna subarrays (e.g., a per-antenna subarray group basis), for individual antenna modules (e.g., a per-antenna module basis), or any combination thereof.

For example, the capability control signaling 230 may indicate a maximum number of beam switches that may be performed within an antenna subarray in a slot 215 (e.g., maxNumberRxTxBeamSwitchDLwithinSubarray), as well as the smallest number of symbols within the slot 215 over which the maximum number of beam switches may be performed/exercised (e.g., NumberSymbolsRxTxBeamSwitchDLwithinSubarray). In this regard, the term maxNumberRxTxBeamSwitchDLwithinSubarray may be considered an intra-subarray variant of the term maxNumberRxTxBeamSwitchDL which is used in some wireless communications systems.

For instance, the capability control signaling 230 may indicate a first quantity of beam switches supported within a first time period 220-a for a first antenna subarray, and a second quantity of beam switches supported within a second time period 220-b for a second antenna subarray. In particular, as shown in FIG. 2, the capability control signaling 230 may indicate that the UE 115-a may perform three beam switches (e.g., maxNumberRxTxBeamSwitchDLwithinSubarray=3) over the first time period 220-a which spans seven symbols (e.g., NumberSymbolsRxTxBeamSwitchDLwithinSubarray=7). Comparatively, as shown in FIG. 2, the capability control signaling 230 may indicate that the UE 115-a may perform two beam switches (e.g., maxNumberRxTxBeamSwitchDLwithinSubarray=2) over the second time period 220-b which spans seven symbols (e.g., NumberSymbolsRxTxBeamSwitchDLwithinSubarray=7).

It is noted herein that, by definition, maxNumberRxTxBeamSwitchDLwithinSubarray≤NumberRxTxBeamSwitchDLwithinSubarray. Moreover, the inter-subarray variant (e.g., maxNumberRxTxBeamSwitchDLwithinSubarray) which captures all beam switches across all the antenna subarrays of the UE 115-a within the slot 215 is the same as maxNumberRxTxBeamSwitchDL which is used by some conventional wireless communications systems. Using conventional techniques for reporting beam switching capability, the UE 115-a may be required to support seven beam switches within the slot 215 (e.g., maxNumberRxTxBeamSwitchDLwithinSubarray=7), which may require more complex RF circuitry as compared to a capability to support two separate, independent beam switching capabilities for the respective time periods 220-a, 220-b.

In some cases, in order to reduce control signaling, the capability control signaling 230 may indicate a quantity of beam switches that the UE 115-a may support for a set of multiple antenna subarrays. In this regard, the capability control signaling 230 may indicate quantities of supported beam switches for pairs of antenna subarrays, triples of antenna subarrays, and the like. As such, the capability control signaling 230 may indicate quantities of inter-subarray beam switches which are allowed for different combinations or groups of antenna subarrays.

For example, the capability control signaling 230 may indicate that a first set of antenna subarrays support a first quantity of beam switches within a time period 220, and that a second set of antenna subarrays support a second quantity of beam switches within the time period 220. In this example, the first set of antenna subarrays and/or the second set of antenna subarrays may include antenna subarrays which are within the same antenna module, across multiple modules, or both. Reporting quantities of supported beam switches for groups of antenna subarrays may reduce the amount of data which is included in the capability control signaling 230. However, it is noted herein that reporting beam switching capabilities for groups of antenna subarrays may increase control signaling in cases where there are large numbers of potential antenna subarray groups, such as at higher bands which use multiple antenna modules each including large quantities of antenna elements).

Moreover, in some cases, the capability control signaling 230 may indicate a quantity of antenna subarray switches (e.g., maxNumberSubarraySwitches) which the UE 115-a may perform within the slot 215 or other time period 220. In this regard, the capability field maxNumberSubarraySwitches may indicate how many times the UE 115-a may switch to a different antenna subarray within a time period 220. For example, if the UE 115-a may only perform two antenna subarray switches within the first time period 220-a, the capability control signaling 230 may indicate maxNumberSubarraySwitches=2.

In additional or alternative implementations, the capability control signaling 230 may indicate a quantity of beam switches that the UE 115-a may support on a per-antenna module basis. For example, the capability control signaling 230 may indicate a maximum number of beam switches that may be performed within an antenna module in a slot (e.g., maxNumberRxTxBeamSwitchDLwithinAntModule), as well as the smallest number of symbols within the slot over which the maximum number of beam switches may be performed/exercised (e.g., NumberSymbolsRxTxBeamSwitchDLwithinAntModule). In this regard, the capability control signaling 230 may include two capability fields, where the first capability field (e.g., maxNumberRxTxBeamSwitchDLwithinAntModule) defines how many beam switches within an antenna module which is controlled by one or a few RFICs may be performed by the UE 115-a).

For instance, the capability control signaling 230 may indicate a first quantity of beam switches supported within the first time period 220-a for a first antenna module, and a second quantity of beam switches supported within the second time period 220-b for a second antenna module. In particular, as shown in FIG. 2, the capability control signaling 230 may indicate that the UE 115-a may perform three beam switches (e.g., maxNumberRxTxBeamSwitchDLwithinAntModule=3) over the first time period 220-a which spans seven symbols (e.g., NumberSymbolsRxTxBeamSwitchDLwithinAntModule=7).

It is noted herein that, by definition, maxNumberRxTxBeamSwitchDLwithinAntModule≤NumberRxTxBeamSwitchDLwithinAntModule. Moreover, if beam switches across all antenna modules at the UE 115-a are considered or restricted to a single antenna module over the slot 215, the term maxNumberRxTxBeamSwitchDLwithinAntModule is the same as maxNumberRxTxBeamSwitchDL which is used by some conventional wireless communications systems. Using conventional techniques for reporting beam switching capability, the UE 115-a may be required to support seven beam switches within the slot 215 (e.g., maxNumberRxTxBeamSwitchDLwithinSubarray=7), which may require more complex RF circuitry as compared to a capability to support two separate, independent beam switching capabilities for the respective time periods 220-a, 220-b.

Moreover, in some cases, the capability control signaling 230 may indicate a quantity of antenna module switches (e.g., maxNumberAntModuleSwitches) which the UE 115-a may perform within the slot 215 or other time period 220. In this regard, the capability field maxNumberAntModuleSwitches may indicate how many times the UE 115-a may switch to a different antenna module within a time period 220. For example, if the UE 115-a may only perform two antenna module switches within the time period 220-a, the capability control signaling 230 may indicate maxNumberAntModuleSwitches=2.

In addition to, or in the alternate to, signaling allowed numbers of beam switches for individual antenna subarrays, for groups of antenna subarrays, and/or for individual antenna modules, the capability control signaling 230 may indicate which beams 210 may be used to support the allowed number of beam switches. Beam switches may be performed more efficiently (e.g., faster) for some groups of beams 210 as compared to other groups of beams 210. For example, the UE 115-a may be able to perform beam switches more quickly between beams 210 A-E as compared to beam switches between beams 210 F-H. In this regard, for a given time period, the UE 115-a may be able to perform more beam switches between beams A-E as compared to beam switches between beams F-H. In other words, the capability control signaling 230 may indicate information associated with allowed permutations of beam switches. In particular, allowed permutations of beam switches may be reported for within/across antenna subarrays, within/across groups of antenna subarrays, within/across antenna modules, or any combination thereof.

For instance, the capability control signaling 230 may indicate a first set of beams 210 (e.g., beams 210-a, 210-b, 210-c) supported by the first quantity of beam switches which may be performed over the first time period 220-a within/across a first antenna subarray, a first antenna module, or both. Similarly, the capability control signaling 230 may indicate a second set of beams 210 (e.g., beams 210-d, 210-e) supported by the second quantity of beam switches which may be performed over the second time period 220-b within/across a second antenna subarray, a second antenna module, or both. In this regard, the capability control signaling 230 may how many beam switches may be performed within the given time periods 220-a, 220-b, as well as which beams 210 may be used to support the beam switches.

More specifically, the capability control signaling 230 may indicate beam switch permutations which are allowed or disallowed. The term "beam switch permutation" may refer to a sequential order of beams across which beam switches may be performed. For example, the capability control signaling 230 may indicate that the UE 115-a may perform three beam switches within the first time period 220-a if the beam switch permutation A-B-C-D is used, but may perform only two beam switches within the first time period 220-b if the beam switch permutation E-F-G is used (e.g., A-B-C-D and E-F-G are allowed beam switch permutations). By way of another example, the capability control singling may indicate that it may not support beam switches between beams H-I-J within the first time period 220-b (e.g., H-I-J is a disallowed beam switch permutation).

In this regard, some beam switch permutations may be allowed/supported within/across antenna subarrays and/or antenna modules, whereas other beam switch permutations may not be allowed/supported for the same number of beam switches. In some aspects, which beam switch permutations are allowed/supported may depend on the RFIC/IFIC architecture of the respective antenna subarrays and/or antenna modules (e.g., RF components used to generate the respective beams 210), the number of antenna elements supported by the RFIC/IFIC architecture, beam widths of supported beams 210, and the like.

Additionally, or alternatively, the capability control signaling 230 may indicate one or more parameters associated with performing beam switching procedures at the UE 115-a. In particular, the capability control signaling 230 may indicate parameters which affect, or approximate, a capability of the UE 115-a to perform beam switches, including an angular distance (e.g., great circle distance) between respective beams 210, RF components associated with the respective beams 210, beamwidths associated with the respective beams 210, quantities of antenna elements associated with the respective beams 210, and the like. For example, if certain beam switch permutations are disallowed, the disallowed beam switch permutations may be indicated via an approximation which is based on some measure of an angular distance been beams of the disallowed beam switch permutations.

In some aspects, the UE 115-a may receive, from the base station 105-a, a grant 235 which schedules one or more messages (e.g., downlink messages 240, uplink messages 245) between the UE 115-a and the base station 105-a. The grant 235 may be indicated via control signaling (e.g., RRC message, MAC-CE message, downlink control information (DCI) message) and may schedule any type of communication, including physical uplink shared channel (PUSCH) messages, physical downlink shared channel (PDSCH) messages, sidelink messages, and the like.

In some aspects, the UE 115-a may receive the grant 235 based on (e.g., in response to) transmitting the capability control signaling 230. In particular, the grant 235 may schedule one or more messages within one or more transmission time intervals (TTIs 225) of a time period 220 and in accordance with the capability control signaling 230. In an example, a TTI 225 may be one or more symbol periods, and the time period 220 may be a slot. Moreover, the grant 235 may indicate one or more beams 210 of the UE 115-a which are to be used to perform the scheduled messages.

For example, the capability control signaling 230 may indicate a first quantity of beam switches supported within the first time period 220-a for a first antenna subarray and/or first antenna module, and a second quantity of beam switches supported within the second time period 220-b for a second antenna subarray and/or second antenna module. In this example, the grant 235 may schedule a first set of messages within the first time period 220-a which are to be performed by the first antenna array and/or first antenna module, and a second set of messages within the second time period 220-b which are to be performed by the second antenna array and/or second antenna module. In this regard, the grant 235 may schedule the first and second sets of messages within the first time period 220-a and the second time period 220-b, respectively, such that the UE 115-a is able to transmit/receive the scheduled sets of messages in accordance with the supported quantities of beam switches.

For instance, the grant 235 may schedule a first message (e.g., downlink message 240-a) which is to be performed in a first TTI 225-a of the first time period, a second message (e.g., uplink message 245-a) which is to be performed in the second TTI 225-b of the first time period 220-a, and a third message (e.g., downlink message 240-b) which is to be performed in the third TTI 225-c of the first time period 220-a.

Moreover, continuing with the example above, the grant 235 may indicate a first set of beams 210 (e.g., beams 210-a, 210-b, 210-c) usable by the UE 115-a to transmit/receive the first set of messages during the first time period 220-a, and a second set of beams 210 (e.g., beams 210-d, 210-e) usable by the UE 115-a to transmit/receive the second set of messages during the second time period 220-b. The beams 210 indicated in the grant 235 may be based on individual beams 210 indicated in the capability control signaling 230, allowed/disallowed beam switch permutations indicated in the capability control signaling 230, other parameters reported in the capability control signaling 230 (e.g., angular distance between beams 210, RF components associated with beams 210). Moreover, the grant 235 may schedule the one or more messages within the respective time periods based on (e.g., in accordance) with supported quantities of antenna module switches and/or antenna subarray switches indicated via the capability control signaling 230.

Subsequently, the UE 115-a may transmit and/or receive messages (e.g., downlink messages 240, uplink messages 245) scheduled by the grant 235 over the first time period 220-a. In this regard, the UE 115-a may transmit and/or receive the messages within the first time period 220-a based on (e.g., in accordance with) transmitting the capability control signaling 230, receiving the grant 235, or both.

For example, the capability control signaling 230 may indicate a first quantity of beam switches supported within the first time period 220-a for a first antenna subarray and/or first antenna module, and the grant 235 may schedule a set of messages within the first time period 220-a in accordance with the grant 235. The grant 235 may further indicate a first set of beams 210 (e.g., beams 210-a, 210-b, 210-c) which are to be used by the UE 115-a to transmit/receive the messages during the first time period 220-a. In this example, the UE 115-a may transmit/receive the scheduled uplink messages 245 and/or downlink messages 240, respectively, over the first time period 220-a using the first antenna subarray, the first antenna module, or both, using the indicated first set of beams 210-a, 210-b, 210-c. In this regard, the UE 115-a may be configured to perform beam switches (e.g., retuning of RF components, internal processing) between the first TTI 225-a and the second TTI 225-b and between the second TTI 225-b and the third TTI 225-c in order to switch between the respective beams 210.

Similarly, the UE 115-a may transmit and/or receive messages scheduled by the grant 235 over the second time period 220-b. In this regard, the UE 115-a may transmit and/or receive the messages within the second time period 220-b based on (e.g., in accordance with) transmitting the capability control signaling 230, receiving the grant 235, transmitting/receiving the messages during the first time period 220-a, or any combination thereof.

For example, the capability control signaling 230 may indicate a second quantity of beam switches supported within the second time period 220-b for a second antenna subarray and/or second antenna module, and the grant 235 may schedule a set of messages within the second time period 220-b in accordance with the grant 235. The grant 235 may further indicate a second set of beams 210 (e.g., beams 210-c, 210-e) which are to be used by the UE 115-a to transmit/receive the messages during the second time period 220-b. In this example, the UE 115-a may transmit/receive the uplink messages 245 and/or downlink messages 240, respectively, over the second time period 220-b using the second antenna subarray, the second antenna module, or both, using the indicated second set of beams 210-d, 225-e. In this regard, the UE 115-a may be configured to perform beam switches (e.g., retuning of RF components, internal processing) between the first TTI 225-d and the second TTI 225-e of the second time period 220-b in order to switch between the respective beams 210.

Additionally, or alternatively, the UE 115-b may be configured to perform an antenna subarray switch and/or antenna module switch between the first time period 220-a and the second time period 220-b in order to switch between antenna subarrays and/or antenna modules, respectively, in order to transmit/receive the messages during the second time period 220-b. For instance, in cases where the first set of beams 210-a, 210-b, and 210-c are generated using a first antenna subarray and the second set of beams 210-d, 210-e are generated using a second antenna subarray, the UE 115-a may perform an antenna subarray switch between the first time period 220-a and the second time period 220-b. By way of another example, in cases where the first set of beams 210-a, 210-b, and 210-c are generated using a first antenna module and the second set of beams 210-d, 210-e are generated using a second antenna module, the UE 115-a may perform an antenna module switch between the first time period 220-a and the second time period 220-b.

Techniques described herein may enable the UE 115-a to report multiple beam switching capabilities with a finer granularity, such as on a per-antenna module basis and/or a per-antenna subarray basis. Enabling the UE 115-a to report multiple beam switching capabilities at a finer granularity may enable the network (e.g., base station 105-a) to schedule communications at the UE 115-a over beams and time periods which account for individual RF settling times and beam switching times at the respective antenna modules and/or antenna arrays of the UE 115-a. As such, techniques described herein may enable the network to schedule communications at the UE 115-a which are tailored to the specific beam switching capabilities of the UE 115-a, which may lead to a more efficient use of resources, reduced latency of communications at the UE 115-a, and higher throughput.

Figure 3:
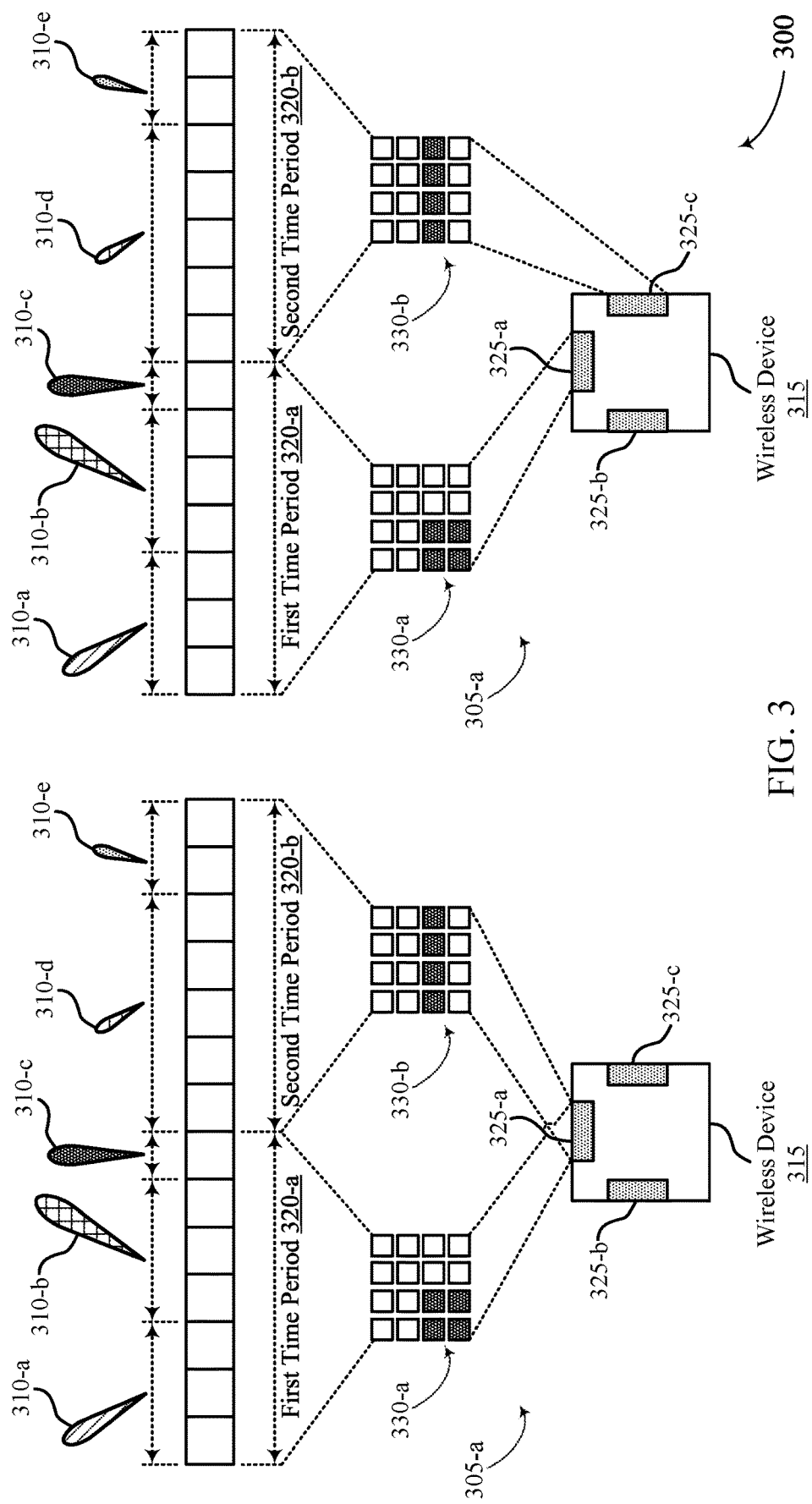
FIG. 3 illustrates an example of a resource configuration that supports techniques for indicating beam switching capability in accordance with aspects of the present disclosure.

FIG. 3 illustrates an example of a resource configuration 300 that supports techniques for indicating beam switching capability in accordance with aspects of the present disclosure. Aspects of the resource configuration 300 may implement, or be implemented by, aspects of the wireless communications system 100, wireless communications system 200, or both.

Aspects of the present disclosure may support techniques for reporting beam switching capabilities at wireless devices (e.g., UEs 115, IAB nodes). In particular, the aspects of the present disclosure may support techniques for reporting beam switching capabilities supported by wireless device with a finer granularity. In particular, techniques described herein may enable wireless devices 315 to report beam switching capabilities for individual antenna subarrays 330, sets of antenna subarrays 330, individual antenna modules 325, or any combination thereof.

For example, referring to resource allocation schemes 305-a, 305-b, a wireless device 315 (e.g., UE 115, IAB node, CPE) may include a first antenna module 325-a, a second antenna module 325-b, and a third antenna module 325-c. The respective antenna modules 325 may each include an antenna array including one or more antenna subarrays 330, where each antenna subarray 330 includes one or more antenna element.

For instance, referring to the first resource allocation scheme 305-a, the first antenna module 330-a may include a 4×4 array of antenna elements, where the array of antenna elements includes a first antenna subarray 330-a (e.g., 2×2 antenna subarray 330-a) and a second antenna subarray 330-b (e.g., 1×4 antenna subarray 330-b). By way of another example, referring to the second resource allocation scheme 305-a, the first antenna module 330-a may include a 4×4 array of antenna elements, where the array of antenna elements includes a first antenna subarray 330-a (e.g., 2×2 antenna subarray 330-a). Similarly, continuing with reference to the second resource allocation scheme 305-a, the third antenna module 325-c may include a 4×4 array of antenna elements, where the array of antenna elements includes and a second antenna subarray 330-b (e.g., 1×4 antenna subarray 330-b).

Generally, the first resource allocation scheme 305-*a* illustrates beam switching across antenna subarrays 330-*a*, 330-*b* within a single antenna module 325-*a*, and the second resource allocation scheme 305-*b* illustrates beam switching across antenna subarrays 330-*a*, 330-*b* and across antenna modules 325-*a*, 325-*c*. In both resource allocation schemes 305-*a*, 305-*b*, the wireless device 315 may be configured to perform three beam switches across the first antenna subarray 330-*a* during the first time period 320-*a* to switch between the beams 310-*a*, 310-*b*, and 310-*c*, and two beam switches across the second antenna subarray 330-*b* during the second time period 320-*b* to switch between the beams 310-*d*, 310-*e*.

Referring to the first resource allocation scheme 305-*a*, the wireless device 315 may be configured to perform an antenna subarray switch between the first antenna subarray 330-*a* and the second antenna subarray 330-*b* (but not an antenna module switch) between the first time period 320-*a* and the second time period 320-*b*. Comparatively, referring to the second resource allocation scheme 305-*b*, the wireless device 315 may be configured to perform an antenna subarray switch between the first antenna subarray 330-*a* and the second antenna subarray 330-*b* as well as an antenna module switch to switch between the first antenna module 325-*a* and the third antenna module 325-*c* between the first time period 320-*a* and the second time period 320-*b*.

Figure 4:
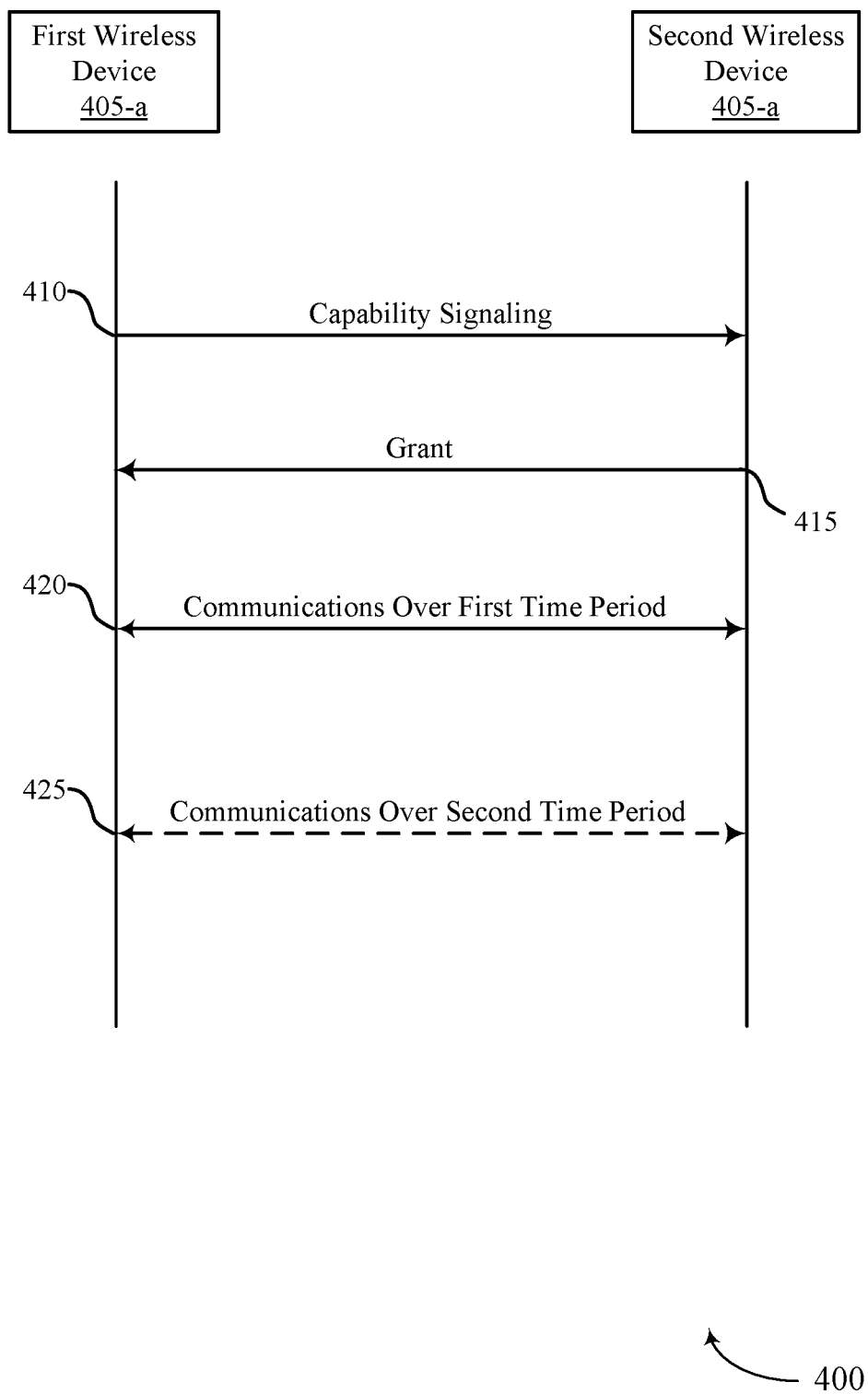
FIG. 4 illustrates an example of a process flow that supports techniques for indicating beam switching capability in accordance with aspects of the present disclosure.

FIG. 4 illustrates an example of a process flow 400 that supports techniques for indicating beam switching capability in accordance with aspects of the present disclosure. In some examples, process flow 400 may implement, or be implemented by, aspects of wireless communications system 100, wireless communications system 200, resource configuration 300, or any combination thereof. For example, the process flow 400 may illustrate a first wireless device 405-*a* which is configured to transmit capability signaling indicating a quantity of supported beam switches, receive a grant in response to the capability signaling, and perform communications scheduled by the grant in accordance with the grant and the quantity of supported beam switches, as described with reference to FIGS. 1-2, among other aspects.

In some aspects, the process flow 400 may include a first wireless device 405-*a* and a second wireless device 405-*b*, which may include examples of UEs 115, base stations 105, and other wireless devices (e.g., IAB nodes, CPEs, repeater nodes, relay nodes, IRS nodes) described with reference to FIGS. 1-3. For example, the first wireless device 405-*a* and the second wireless device 405-*b* illustrated in FIG. 4 may be examples of the UE 115-*a* and base station 105-*a*, respectively, as illustrated in FIG. 2. Additionally, or alternatively, the first wireless device 405-*a* and the second wireless device 405-*b* may include examples of a first IAB node and a second IAB node, respectively.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some aspects, the first wireless device 405-*a* may include one or more antenna modules, where each antenna module includes an antenna array including a set of antenna elements (e.g., 4×4 array of antenna elements). Each antenna array may include multiple antenna subarrays, where each antenna subarray includes one or more antenna elements. In some aspects, the respective antenna arrays and antenna subarrays may be used to generate the respective beams for communications at the first wireless device 405-*a*. The process flow 400 may support signaling which enables the first wireless device 405-*a* to report beam switching capabilities for individual antenna subarrays, for sets of antenna subarrays, for individual antenna modules, or any combination thereof.

At 410, the first wireless device 405-*a* may transmit capability control signaling to the second wireless device 405-*b*. The capability control signaling may indicate one or more capabilities associated with beam switching, antenna module switching, and/or antenna array switching at the first wireless device 405-*a*. In some aspects, the capability control signaling may include L1 signaling, L2 signaling, RRC signaling, or any combination thereof.

In some implementations, the capability control signaling may indicate a quantity of beam switches that the first wireless device 405-*a* may support on a per-antenna subarray basis. For example, the capability control signaling may indicate a maximum number of beam switches that may be performed within an antenna subarray in a slot (e.g., maxNumberRxTxBeamSwitchDLwithinSubarray), as well as the smallest number of symbols within the slot over which the maximum number of beam switches may be performed/exercised (e.g., NumberSymbolsRxTxBeamSwitchDLwithinSubarray). In this regard, the term maxNumberRxTxBeamSwitchDLwithinSubarray may be considered an intra-subarray variant of the term maxNumberRxTxBeamSwitchDL which is used in some wireless communications systems. For instance, the capability control signaling may indicate a first quantity of beam switches supported within a first time period for a first antenna subarray, and a second quantity of beam switches supported within a second time period for a second antenna subarray.

In order to reduce control signaling, in some cases, the capability control signaling may indicate a quantity of beam switches that the first wireless device 405-*a* may support for a set of multiple antenna subarrays. In this regard, the capability control signaling may indicate quantities of supported beam switches for pairs of antenna subarrays, triples of antenna subarrays, and the like. As such, the capability control signaling may indicate quantities of inter-subarray beam switches which are allowed for different combinations or groups of antenna subarrays. For example, the capability control signaling may indicate that a first set of antenna subarrays support a first quantity of beam switches within a time period, and that a second set of antenna subarrays support a second quantity of beam switches within the time period. In this example, the first set of antenna subarrays and/or the second set of antenna subarrays may include antenna subarrays which are within the same antenna module, across multiple modules, or both. Reporting quantities of supported beam switches for groups of antenna subarrays may reduce the amount of data which is included in the capability control signaling.

Moreover, in some cases, the capability control signaling may indicate a quantity of antenna subarray switches (e.g., maxNumberSubarraySwitches) which the first wireless device 405-*a* may perform within a slot or other time period. In this regard, the capability field maxNumberSubarraySwitches may indicate how many times the first wireless device 405-*a* may switch to a different antenna subarray within a time period. For example, if the first wireless device 405-*a* may only perform two antenna subarray switches within a time period, the capability control signaling may indicate maxNumberSubarraySwitches=2.

In additional or alternative implementations, the capability control signaling may indicate a quantity of beam switches that the first wireless device 405-*a* may support on a per-antenna module basis. For example, the capability control signaling may indicate a maximum number of beam switches that may be performed within an antenna module in a slot (e.g., maxNumberRxTxBeamSwitchDLwithinAntModule), as well as the smallest number of symbols within the slot over which the maximum number of beam switches may be performed/exercised (e.g., NumberSymbolsRxTxBeamSwitchDLwithinAntModule). In this regard, the capability control signaling may include two capability fields, where the first capability field (e.g., maxNumberRxTxBeamSwitchDLwithinAntModule) defines how many beam switches within an antenna module which is controlled by one or a few RFICs may be performed by the first wireless device 405-*a*). For instance, the capability control signaling may indicate a first quantity of beam switches supported within a first time period for a first antenna module, and a second quantity of beam switches supported within a second time period for a second antenna module.

Moreover, in some cases, the capability control signaling may indicate a quantity of antenna module switches (e.g., maxNumberAntModuleSwitches) which the first wireless device 405-*a* may perform within a slot or other time period. In this regard, the capability field maxNumberAntModuleSwitches may indicate how many times the first wireless device 405-*a* may switch to a different antenna module within a time period. For example, if the first wireless device 405-*a* may only perform two antenna module switches within a time period, the capability control signaling may indicate maxNumberAntModuleSwitches=2.

In addition to, or in the alternate to, signaling allowed numbers of beam switches per antenna subarray, per group of antenna subarray, and/or per antenna module, the capability control signaling may indicate which beams may be used to support the allowed number of beam switches. In other words, the capability control signaling may indicate information associated with allowed permutations of beam switches. In particular, allowed permutations of beam switches may be reported for within/across antenna subarrays, within/across groups of antenna subarrays, within/across antenna modules, or any combination thereof.

For instance, the capability control signaling may indicate a first set of beams supported by a first quantity of beam switches which may be performed within a first time period within/across a first antenna subarray, a first antenna module, or both. Similarly, the capability control signaling may indicate a second set of beams supported by a second quantity of beam switches which may be performed within a second time period within/across a second antenna subarray, a second antenna module, or both. In this regard, the capability control signaling may how many beam switches may be performed within given time periods, as well as which beams may be used to support the beam switches.

More specifically, the capability control signaling may indicate beam switch permutations which are allowed or disallowed. The term "beam switch permutation" may refer to a sequential order of beams across which beam switches may be performed. For example, the capability control signaling may indicate that the first wireless device 405-*a* may perform three beam switches within a time period if the beam switch permutation A-B-C-D is used, but may perform only two beam switches within the time period if the beam switch permutation E-F-G is used (e.g., A-B-C-D and E-F-G are allowed beam switch permutations). By way of another example, the capability control singling may indicate that it may not support beam switches between beams H-I-J within a time period (e.g., H-I-J is a disallowed beam switch permutation).

In some aspects, the capability control signaling may indicate one or more parameters associated with performing beam switching procedures at the first wireless device 405-*a*. In particular, the capability control signaling may indicate parameters which affect, or approximate, a capability of the first wireless device 405-*a* to perform beam switches, including an angular distance between respective beams, RF components associated with the respective beams, beamwidths associated with the respective beams, quantities of antenna elements associated with the respective beams, and the like. For example, if certain beam switch permutations are disallowed, the disallowed beam switch permutations may be indicated via an approximation which is based on some measure of an angular distance been beams of the disallowed beam switch permutations.

At 415, the first wireless device 405-*a* may receive, from the second wireless device 405-*b*, a grant which schedules one or more messages between the first wireless device 405-*a* and the second wireless device 405-*b*. The grant may be indicated via control signaling (e.g., RRC message, MAC-CE message, DCI message) and may schedule any type of communication, including PUSCH messages, PDSCH messages, sidelink messages, and the like.

In some aspects, the first wireless device 405-*a* may receive the grant based on (e.g., in response to) transmitting the capability control signaling at 410. In particular, the grant may schedule one or more messages within one or more TTIs of a time period and in accordance with the capability control signaling. Moreover, the grant may indicate one or more beams of the first wireless device 405-*a* which are to be used to perform the scheduled transmissions.

For example, the capability control signaling may indicate a first quantity of beam switches supported within a first time period for a first antenna subarray and/or first antenna module, and a second quantity of beam switches supported within a second time period for a second antenna subarray and/or second antenna module. In this example, the grant may schedule a first set of messages within the first time period which are to be performed by the first antenna array and/or first antenna module, and a second set of messages within the second time period which are to be performed by the second antenna array and/or second antenna module. In this regard, the grant may schedule the first and second sets of messages within the first and second time periods, respectively, such that the first wireless device 405-*a* is able to transmit/receive the scheduled sets of messages in accordance with the supported quantities of beam switches.

Moreover, continuing with the example above, the grant may indicate a first set of beams usable by the first wireless device 405-*a* to transmit/receive the first set of messages, and a second set of beams usable by the first wireless device 405-*a* to transmit/receive the second set of messages. The beams indicated in the grant may be based on individual beams indicated in the capability control signaling, allowed/disallowed beam switch permutations indicated in the capability control signaling, other parameters reported in the capability control signaling (e.g., angular distance between beams, RF components associated with beams). Moreover, the grant may schedule the one or more messages within the respective time periods based on (e.g., in accordance) with supported quantities of antenna module switches and/or antenna subarray switches indicated via the capability control signaling.

At 420, the first wireless device 405-a may transmit and/or receive messages scheduled by the grant over the first time period. In this regard, the first wireless device 405-a may transmit and/or receive the messages within the first time period based on (e.g., in accordance with) transmitting the capability control signaling at 410, receiving the grant at 415, or both.

For example, the capability control signaling may indicate a first quantity of beam switches supported within a first time period for a first antenna subarray and/or first antenna module, and the grant may schedule a set of messages within the first time period in accordance with the grant. The grant may further indicate a first set of beams which are to be used by the first wireless device 405-a to transmit/receive the messages during the first time interval. In this example, the first wireless device 405-a may transmit/receive the messages over the first time period using the first antenna subarray, the first antenna module, or both, using the indicated first set of beams.

At 425, the first wireless device 405-a may transmit and/or receive messages scheduled by the grant over the second time period. In this regard, the first wireless device 405-a may transmit and/or receive the messages within the second time period based on (e.g., in accordance with) transmitting the capability control signaling at 410, receiving the grant at 415, transmitting/receiving the messages during the first time period at 420, or any combination thereof.

For example, the capability control signaling may indicate a second quantity of beam switches supported within a second time period for a second antenna subarray and/or second antenna module, and the grant may schedule a set of messages within the second time period in accordance with the grant. The grant may further indicate a second set of beams which are to be used by the first wireless device 405-a to transmit/receive the messages during the second time interval. In this example, the first wireless device 405-a may transmit/receive the messages over the second time period using the second antenna subarray, the second antenna module, or both, using the indicated second set of beams.

Techniques described herein may enable the first wireless device 405-a to report multiple beam switching capabilities with a finer granularity, such as on a per-antenna module basis and/or a per-antenna subarray basis. Enabling the first wireless device 405-a to report multiple beam switching capabilities at a finer granularity may enable the network (e.g., second wireless device 405-b) to schedule communications at the first wireless device 405-a over beams and time periods which account for individual RF settling times and beam switching times at the respective antenna modules and/or antenna arrays of the first wireless device 405-a. As such, techniques described herein may enable the network to schedule communications at the first wireless device 405-a which are tailored to the specific beam switching capabilities of the first wireless device 405-a, which may lead to a more efficient use of resources, reduced latency of communications at the first wireless device 405-a, and higher throughput.

Figure 5:
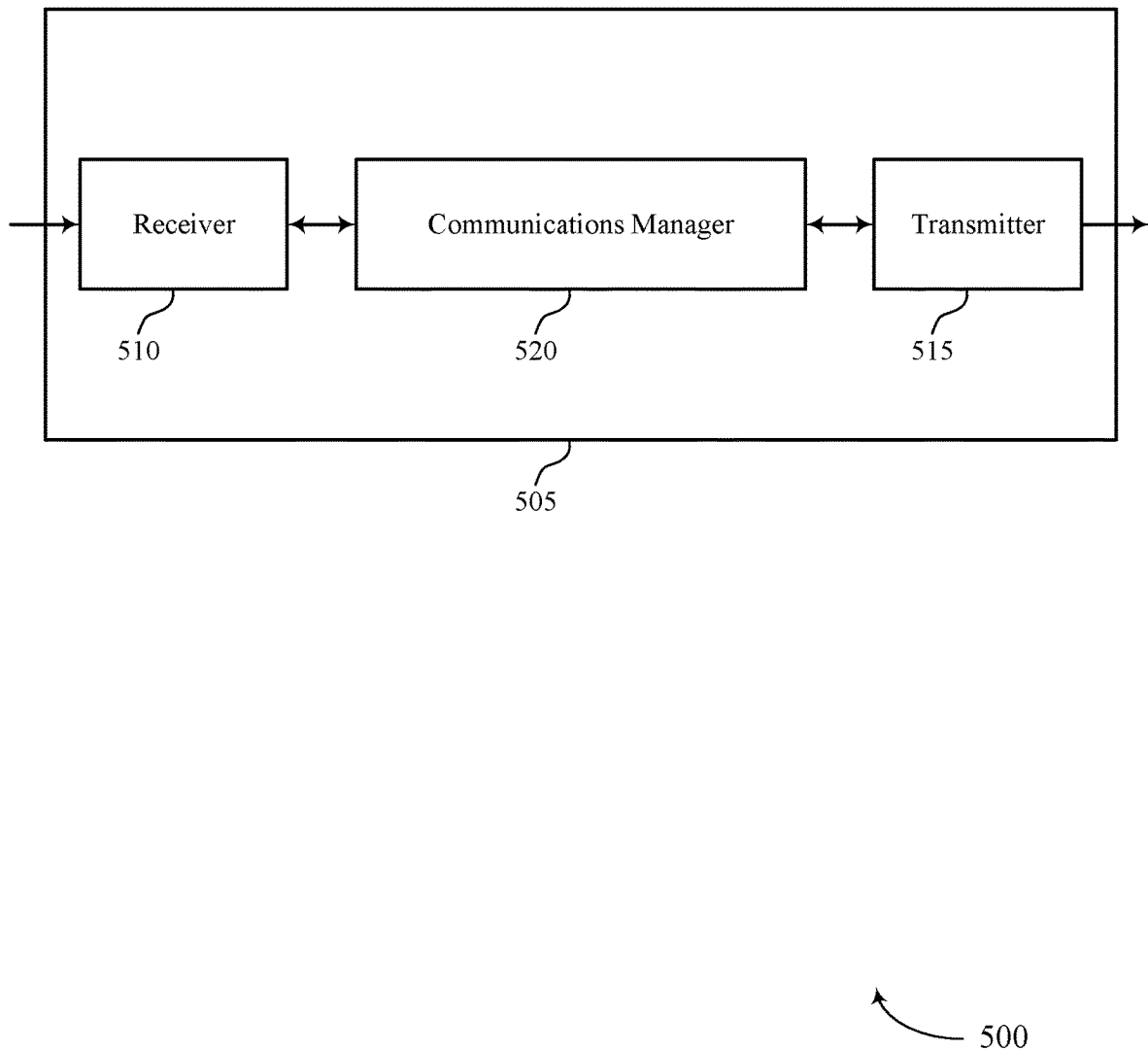
FIGS. 5 and 6 show block diagrams of devices that support techniques for indicating beam switching capability in accordance with aspects of the present disclosure.

FIG. 5 shows a block diagram 500 of a device 505 that supports techniques for indicating beam switching capability in accordance with aspects of the present disclosure. The device 505 may be an example of aspects of a UE 115 as described herein. The device 505 may include a receiver 510, a transmitter 515, and a communications manager 520.

The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating beam switching capability). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating beam switching capability). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for indicating beam switching capability as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for transmitting, to a second wireless device, capability control signaling indicating a first quantity of beam switches is supported within a first time period for a first antenna subarray, a first antenna module, or both, of the first wireless device. The communications manager 520 may be configured as or otherwise support a means for receiving, from the second wireless device in accordance with the capability control signaling, a grant scheduling one or more messages and indicating a set of multiple beams of the first wireless device over which to communicate the one or more messages in respective TTIs of the first time period. The communications manager 520 may be configured as or otherwise support a means for transmitting or receiving, over the first time period using the first antenna subarray, the first antenna module, or both, the one or more messages using the set of multiple beams.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reporting multiple beam switching capabilities with a finer granularity, such as on a per-antenna module basis and/or a per-antenna subarray basis. Enabling wireless devices (e.g., UEs 115) to report multiple beam switching capabilities at a finer granularity may enable the network (e.g., base stations 105) to schedule communications at the UEs 115 over beams and time periods which account for individual RF settling times and beam switching times at the respective antenna modules and/or antenna arrays of the UEs 115. As such, techniques described herein may enable the network to schedule communications at the UE 115 which are tailored to the specific beam switching capabilities of the UE 115, which may lead to a more efficient use of resources, reduced latency of communications at the UEs 115, and higher throughput.

Figure 6:
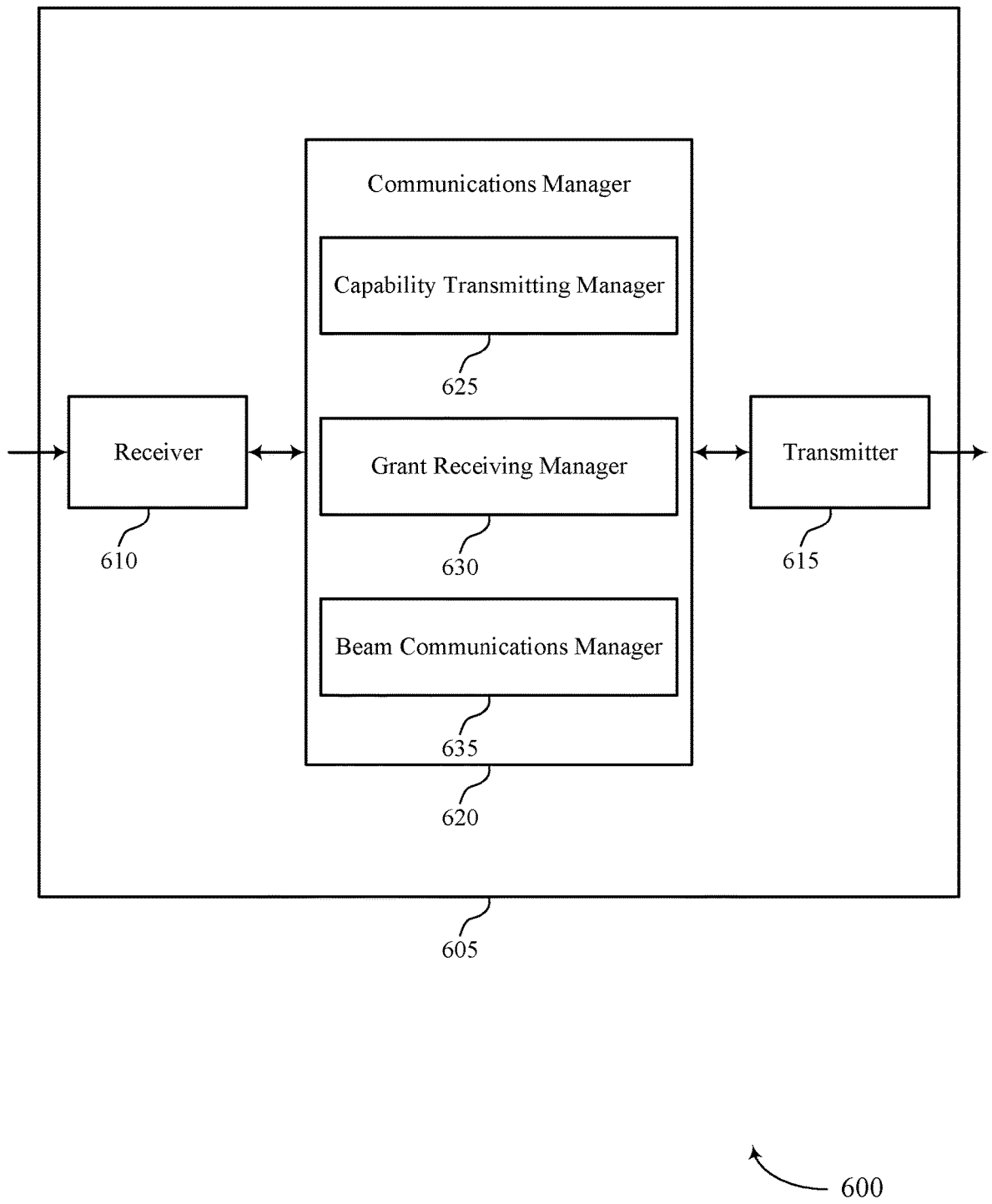

FIG. 6 shows a block diagram 600 of a device 605 that supports techniques for indicating beam switching capability in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating beam switching capability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating beam switching capability). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for indicating beam switching capability as described herein. For example, the communications manager 620 may include a capability transmitting manager 625, a grant receiving manager 630, a beam communications manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The capability transmitting manager 625 may be configured as or otherwise support a means for transmitting, to a second wireless device, capability control signaling indicating a first quantity of beam switches is supported within a first time period for a first antenna subarray, a first antenna module, or both, of the first wireless device. The grant receiving manager 630 may be configured as or otherwise support a means for receiving, from the second wireless device in accordance with the capability control signaling, a grant scheduling one or more messages and indicating a set of multiple beams of the first wireless device over which to communicate the one or more messages in respective TTIs of the first time period. The beam communications manager 635 may be configured as or otherwise support a means for transmitting or receiving, over the first time period using the first antenna subarray, the first antenna module, or both, the one or more messages using the set of multiple beams.

Figure 7:
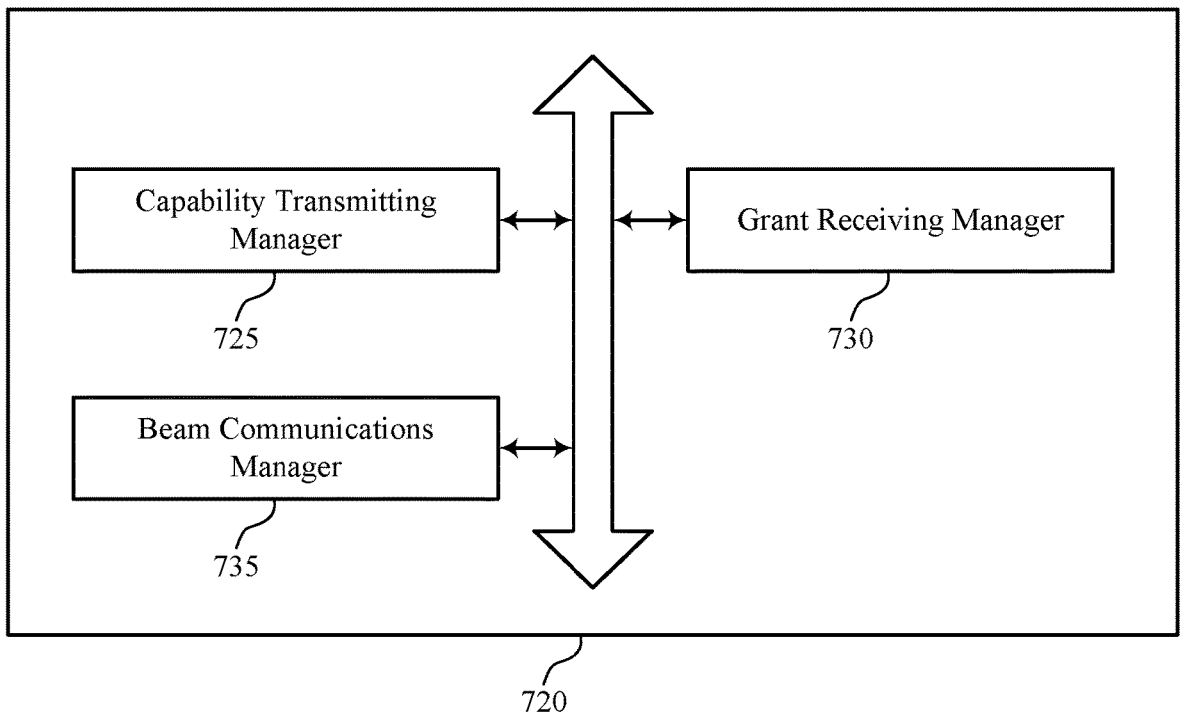
FIG. 7 shows a block diagram of a communications manager that supports techniques for indicating beam switching capability in accordance with aspects of the present disclosure.

FIG. 7 shows a block diagram 700 of a communications manager 720 that supports techniques for indicating beam switching capability in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for indicating beam switching capability as described herein. For example, the communications manager 720 may include a capability transmitting manager 725, a grant receiving manager 730, a beam communications manager 735, or any combination thereof. Each of these components may communicate, directly or indirectly, with one another (e.g., via one or more buses).

The communications manager 720 may support wireless communication at a first wireless device in accordance with examples as disclosed herein. The capability transmitting manager 725 may be configured as or otherwise support a means for transmitting, to a second wireless device, capability control signaling indicating a first quantity of beam switches is supported within a first time period for a first antenna subarray, a first antenna module, or both, of the first wireless device. The grant receiving manager 730 may be configured as or otherwise support a means for receiving, from the second wireless device in accordance with the capability control signaling, a grant scheduling one or more messages and indicating a set of multiple beams of the first wireless device over which to communicate the one or more messages in respective TTIs of the first time period. The beam communications manager 735 may be configured as or otherwise support a means for transmitting or receiving, over the first time period using the first antenna subarray, the first antenna module, or both, the one or more messages using the set of multiple beams.

In some examples, to support transmitting the capability control signaling, the capability transmitting manager 725 may be configured as or otherwise support a means for transmitting the capability control signaling indicating a second quantity of beam switches supported within a second time period for a second antenna subarray, a second antenna module, or both, of the first wireless device, where the grant schedules the one or more messages within the first time period and the second time period.

In some examples, to support transmitting or receiving the one or more messages, the beam communications manager 735 may be configured as or otherwise support a means for transmitting or receiving a first subset of the one or more messages within the first time period using a first set of beams of the set of multiple beams generated via the first antenna subarray, the first antenna module, or both. In some examples, to support transmitting or receiving the one or more messages, the beam communications manager 735 may be configured as or otherwise support a means for transmitting or receiving a second subset of the one or more messages within the second time period using a second set of beams of the set of multiple beams generated via the second antenna subarray, the second antenna module, or both.

In some examples, to support receiving the grant, the grant receiving manager 730 may be configured as or otherwise support a means for receiving the grant indicating the first set of beams, the second set of beams, or both.

In some examples, to support transmitting the capability control signaling, the capability transmitting manager 725 may be configured as or otherwise support a means for transmitting the capability control signaling indicating a quantity of antenna subarray switches, a quantity of antenna module switches, or both, supported by the first wireless device within the first time period, where the grant is based on the quantity of antenna subarray switches, the quantity of antenna module switches, or both.

In some examples, to support transmitting the capability control signaling, the capability transmitting manager 725 may be configured as or otherwise support a means for transmitting the capability control signaling indicating the first quantity of beam switches supported within the first time period for a set of multiple antenna subarrays of the first wireless device, the set of multiple antenna subarrays including the first antenna subarray. In some examples, the set of multiple antenna subarrays are associated with a single antenna module of the first wireless device, a set of multiple antenna modules of the first wireless device, or both.

In some examples, to support transmitting the capability control signaling, the capability transmitting manager 725 may be configured as or otherwise support a means for transmitting the capability control signaling indicating the set of multiple beams supported by the first quantity of beam switches within the first time period for the first antenna subarray, the first antenna module, or both. In some examples, to support transmitting the capability control signaling, the capability transmitting manager 725 may be configured as or otherwise support a means for transmitting the capability control signaling indicating a second quantity of beams supported by a second quantity of beam switches within the first time period for the first antenna subarray, the first antenna module, or both.

In some examples, to support transmitting the capability control signaling, the capability transmitting manager 725 may be configured as or otherwise support a means for transmitting the capability control signaling indicating one or more beam switch permutations associated with the set of multiple beams, where the grant schedules the one or more messages in accordance with the one or more beam switch permutations. In some examples, to support transmitting the capability control signaling, the capability transmitting manager 725 may be configured as or otherwise support a means for transmitting the capability control signaling indicating one or more parameters associated with the set of multiple beams including an angular distance between the set of multiple beams, RF components associated with the set of multiple beams, beamwidths associated with the set of multiple beams, a quantity of antenna elements associated with the set of multiple beams, or any combination thereof, where the grant schedules the one or more messages in accordance with the one or more parameters.

In some examples, the first wireless device includes a set of multiple antenna modules including the first antenna module. In some examples, each antenna module includes a set of multiple antenna subarrays. In some examples, each antenna subarray includes one or more antenna elements. In some examples, the capability control signaling includes L1 signaling, L2 signaling, RRC signaling, or any combination thereof. In some examples, the first wireless device includes one of a UE, a CPE, or a first IAB node. In some examples, the second wireless device includes one of a base station or a second IAB node.

Figure 8:
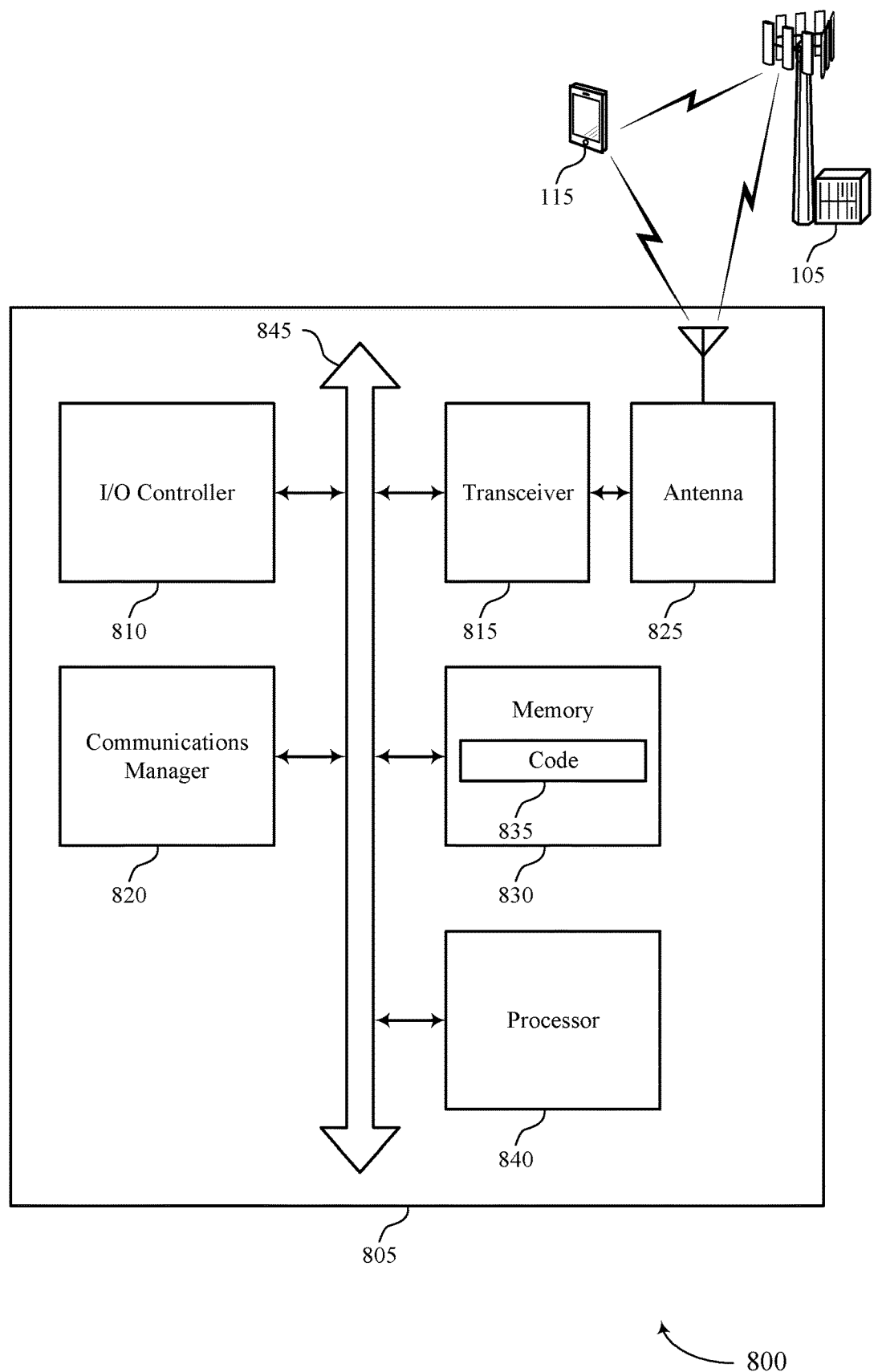
FIG. 8 shows a diagram of a system including a device that supports techniques for indicating beam switching capability in accordance with aspects of the present disclosure.

FIG. 8 shows a diagram of a system 800 including a device 805 that supports techniques for indicating beam switching capability in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for indicating beam switching capability). For example, the device 805 or a component of the device 805 may include a processor 840 and memory 830 coupled to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for transmitting, to a second wireless device, capability control signaling indicating a first quantity of beam switches is supported within a first time period for a first antenna subarray, a first antenna module, or both, of the first wireless device. The communications manager 820 may be configured as or otherwise support a means for receiving, from the second wireless device in accordance with the capability control signaling, a grant scheduling one or more messages and indicating a set of multiple beams of the first wireless device over which to communicate the one or more messages in respective TTIs of the first time period. The communications manager 820 may be configured as or otherwise support a means for transmitting or receiving, over the first time period using the first antenna subarray, the first antenna module, or both, the one or more messages using the set of multiple beams.

By including or configuring the communications manager 820 in accordance with examples as described herein, the device 805 may support techniques for reporting multiple beam switching capabilities with a finer granularity, such as on a per-antenna module basis and/or a per-antenna subarray basis. Enabling wireless devices (e.g., UEs 115) to report multiple beam switching capabilities at a finer granularity may enable the network (e.g., base stations 105) to schedule communications at the UEs 115 over beams and time periods which account for individual RF settling times and beam switching times at the respective antenna modules and/or antenna arrays of the UEs 115. As such, techniques described herein may enable the network to schedule communications at the UE 115 which are tailored to the specific beam switching capabilities of the UE 115, which may lead to a more efficient use of resources, reduced latency of communications at the UEs 115, and higher throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for indicating beam switching capability as described herein, or the processor 840 and the memory 830 may be otherwise configured to perform or support such operations.

Figure 9:
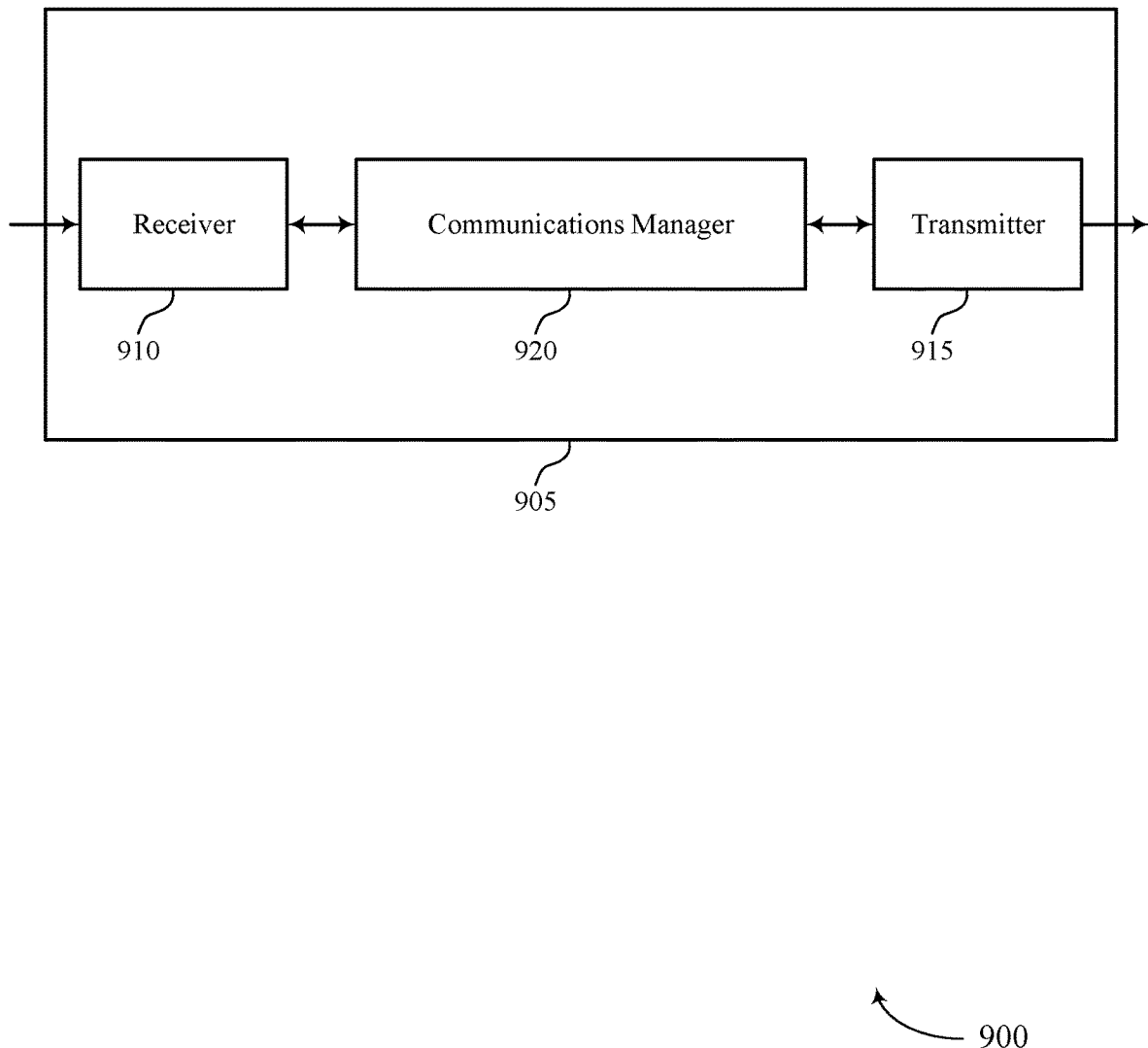
FIGS. 9 and 10 show block diagrams of devices that support techniques for indicating beam switching capability in accordance with aspects of the present disclosure.

FIG. 9 shows a block diagram 900 of a device 905 that supports techniques for indicating beam switching capability in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating beam switching capability). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating beam switching capability). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for indicating beam switching capability as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second wireless device in accordance with examples as disclosed herein. For example, the communications manager 920 may be configured as or otherwise support a means for receiving, from a first wireless device, capability control signaling indicating a first quantity of beam switches is supported within a first time period for a first antenna subarray, a first antenna module, or both, of the first wireless device. The communications manager 920 may be configured as or otherwise support a means for transmitting, to the first wireless device in accordance with the capability control signaling, a grant scheduling one or more messages and indicating a set of multiple beams of the first wireless device over which to communicate the one or more messages in respective TTIs of the first time period. The communications manager 920 may be configured as or otherwise support a means for transmitting or receiving the one or more messages with the first wireless device over the first time period in accordance with the grant.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reporting multiple beam switching capabilities with a finer granularity, such as on a per-antenna module basis and/or a per-antenna subarray basis. Enabling wireless devices (e.g., UEs 115) to report multiple beam switching capabilities at a finer granularity may enable the network (e.g., base stations 105) to schedule communications at the UEs 115 over beams and time periods which account for individual RF settling times and beam switching times at the respective antenna modules and/or antenna arrays of the UEs 115. As such, techniques described herein may enable the network to schedule communications at the UE 115 which are tailored to the specific beam switching capabilities of the UE 115, which may lead to a more efficient use of resources, reduced latency of communications at the UEs 115, and higher throughput.

Figure 10:
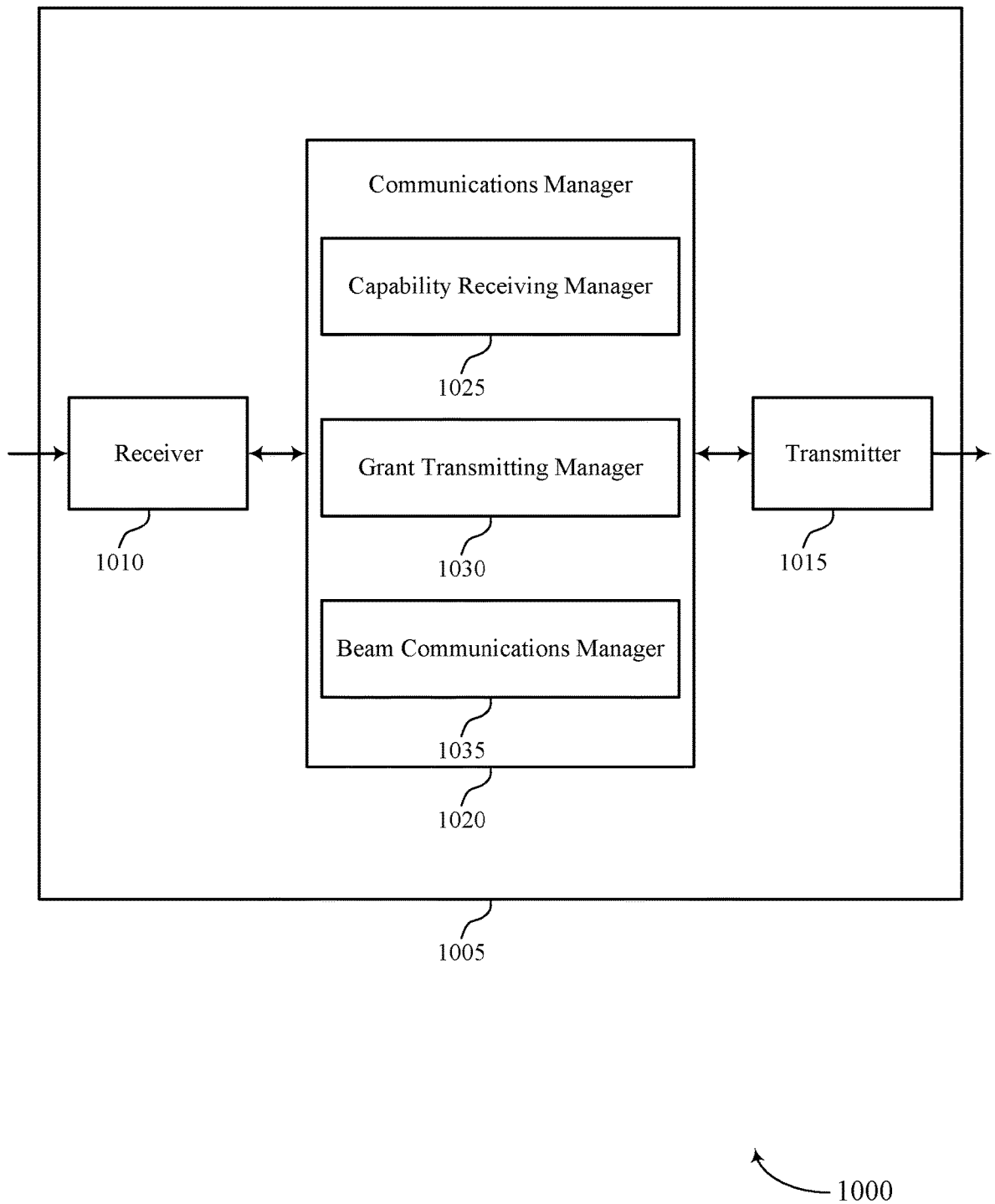

FIG. 10 shows a block diagram 1000 of a device 1005 that supports techniques for indicating beam switching capability in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for indicating beam switching capability). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for indicating beam switching capability). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for indicating beam switching capability as described herein. For example, the communications manager 1020 may include a capability receiving manager 1025, a grant transmitting manager 1030, a beam communications manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second wireless device in accordance with examples as disclosed herein. The capability receiving manager 1025 may be configured as or otherwise support a means for receiving, from a first wireless device, capability control signaling indicating a first quantity of beam switches is supported within a first time period for a first antenna subarray, a first antenna module, or both, of the first wireless device. The grant transmitting manager 1030 may be configured as or otherwise support a means for transmitting, to the first wireless device in accordance with the capability control signaling, a grant scheduling one or more messages and indicating a set of multiple beams of the first wireless device over which to communicate the one or more messages in respective TTIs of the first time period. The beam communications manager 1035 may be configured as or otherwise support a means for transmitting or receiving the one or more messages with the first wireless device over the first time period in accordance with the grant.

Figure 11:
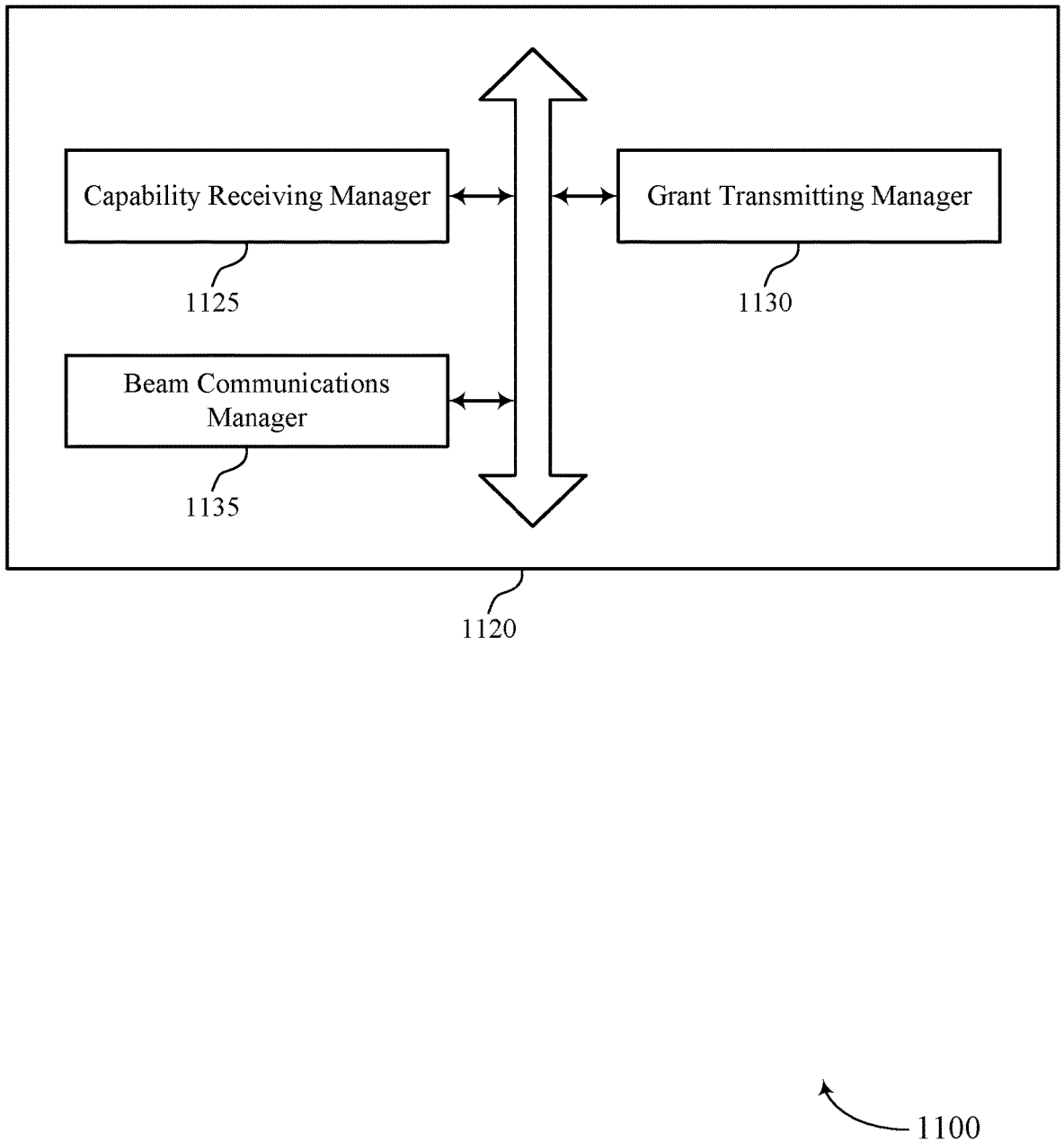
FIG. 11 shows a block diagram of a communications manager that supports techniques for indicating beam switching capability in accordance with aspects of the present disclosure.

FIG. 11 shows a block diagram 1100 of a communications manager 1120 that supports techniques for indicating beam switching capability in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for indicating beam switching capability as described herein. For example, the communications manager 1120 may include a capability receiving manager 1125, a grant transmitting manager 1130, a beam communications manager 1135, or any combination thereof. Each of these components may communicate, directly or indirectly, with one another (e.g., via one or more buses).

The communications manager 1120 may support wireless communication at a second wireless device in accordance with examples as disclosed herein. The capability receiving manager 1125 may be configured as or otherwise support a means for receiving, from a first wireless device, capability control signaling indicating a first quantity of beam switches is supported within a first time period for a first antenna subarray, a first antenna module, or both, of the first wireless device. The grant transmitting manager 1130 may be configured as or otherwise support a means for transmitting, to the first wireless device in accordance with the capability control signaling, a grant scheduling one or more messages and indicating a set of multiple beams of the first wireless device over which to communicate the one or more messages in respective TTIs of the first time period. The beam communications manager 1135 may be configured as or otherwise support a means for transmitting or receiving the one or more messages with the first wireless device over the first time period in accordance with the grant.

In some examples, to support receiving the capability control signaling, the capability receiving manager 1125 may be configured as or otherwise support a means for receiving the capability control signaling indicating a second quantity of beam switches supported within a second time period for a second antenna subarray, a second antenna module, or both, of the first wireless device, where the grant schedules the one or more messages within the first time period and the second time period.

In some examples, to support transmitting or receiving the one or more messages, the beam communications manager 1135 may be configured as or otherwise support a means for transmitting or receiving a first subset of the one or more messages within the first time period based on a first set of beams of the set of multiple beams generated by the first wireless device via the first antenna subarray, the first antenna module, or both. In some examples, to support transmitting or receiving the one or more messages, the beam communications manager 1135 may be configured as or otherwise support a means for transmitting or receiving a second subset of the one or more messages within the second time period based on a second set of beams of the set of multiple beams generated by the first wireless device via the second antenna subarray, the second antenna module, or both.

In some examples, to support transmitting the grant, the grant transmitting manager 1130 may be configured as or otherwise support a means for transmitting the grant indicating the first set of beams, the second set of beams, or both.

In some examples, to support receiving the capability control signaling, the capability receiving manager 1125 may be configured as or otherwise support a means for receiving the capability control signaling indicating a quantity of antenna subarray switches, a quantity of antenna module switches, or both, supported by the first wireless device within the first time period, where the grant is based on the quantity of antenna subarray switches, the quantity of antenna module switches, or both.

In some examples, to support receiving the capability control signaling, the capability receiving manager 1125 may be configured as or otherwise support a means for receiving the capability control signaling indicating the first quantity of beam switches supported within the first time period for a set of multiple antenna subarrays of the first wireless device, the set of multiple antenna subarrays including the first antenna subarray. In some examples, the set of multiple antenna subarrays are associated with a single antenna module of the first wireless device, a set of multiple antenna modules of the first wireless device, or both.

In some examples, to support receiving the capability control signaling, the capability receiving manager 1125 may be configured as or otherwise support a means for receiving the capability control signaling indicating the set of multiple beams supported by the first quantity of beam switches within the first time period for the first antenna subarray, the first antenna module, or both. In some examples, to support receiving the capability control signaling, the capability receiving manager 1125 may be configured as or otherwise support a means for receiving the capability control signaling indicating a second quantity of beams supported by a second quantity of beam switches within the first time period for the first antenna subarray, the first antenna module, or both.

In some examples, to support receiving the capability control signaling, the capability receiving manager 1125 may be configured as or otherwise support a means for receiving the capability control signaling indicating one or more beam switch permutations associated with the set of multiple beams, where the grant schedules the one or more messages in accordance with the one or more beam switch permutations. In some examples, to support receiving the capability control signaling, the capability receiving manager 1125 may be configured as or otherwise support a means for receiving the capability control signaling indicating one or more parameters associated with the set of multiple beams including an angular distance between the set of multiple beams, RF components associated with the set of multiple beams, beamwidths associated with the set of multiple beams, a quantity of antenna elements associated with the set of multiple beams, or any combination thereof, where the grant schedules the one or more messages in accordance with the one or more parameters.

In some examples, the first wireless device includes a set of multiple antenna modules including the first antenna module. In some examples, each antenna module includes a set of multiple antenna subarrays. In some examples, each antenna subarray includes one or more antenna elements. In some examples, the capability control signaling includes L1 signaling, L2 signaling, RRC signaling, or any combination thereof. In some examples, the first wireless device includes one of a UE, a CPE, or a first IAB node. In some examples, the second wireless device includes one of a base station or a second IAB node.

Figure 12:
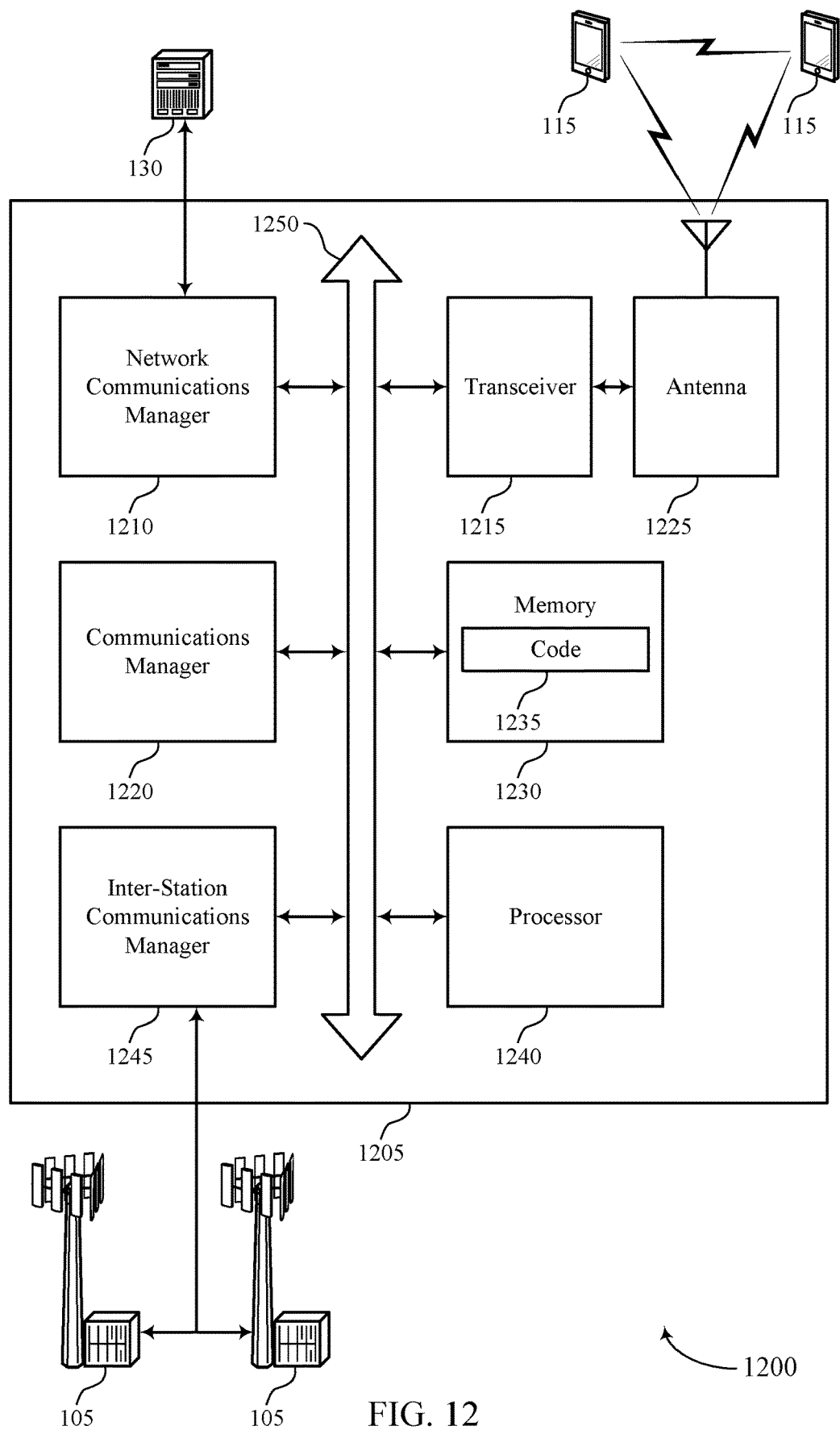
FIG. 12 shows a diagram of a system including a device that supports techniques for indicating beam switching capability in accordance with aspects of the present disclosure.

FIG. 12 shows a diagram of a system 1200 including a device 1205 that supports techniques for indicating beam switching capability in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for indicating beam switching capability). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a second wireless device in accordance with examples as disclosed herein. For example, the communications manager 1220 may be configured as or otherwise support a means for receiving, from a first wireless device, capability control signaling indicating a first quantity of beam switches is supported within a first time period for a first antenna subarray, a first antenna module, or both, of the first wireless device. The communications manager 1220 may be configured as or otherwise support a means for transmitting, to the first wireless device in accordance with the capability control signaling, a grant scheduling one or more messages and indicating a set of multiple beams of the first wireless device over which to communicate the one or more messages in respective TTIs of the first time period. The communications manager 1220 may be configured as or otherwise support a means for transmitting or receiving the one or more messages with the first wireless device over the first time period in accordance with the grant.

By including or configuring the communications manager 1220 in accordance with examples as described herein, the device 1205 may support techniques for reporting multiple beam switching capabilities with a finer granularity, such as on a per-antenna module basis and/or a per-antenna subarray basis. Enabling wireless devices (e.g., UEs 115) to report multiple beam switching capabilities at a finer granularity may enable the network (e.g., base stations 105) to schedule communications at the UEs 115 over beams and time periods which account for individual RF settling times and beam switching times at the respective antenna modules and/or antenna arrays of the UEs 115. As such, techniques described herein may enable the network to schedule communications at the UE 115 which are tailored to the specific beam switching capabilities of the UE 115, which may lead to a more efficient use of resources, reduced latency of communications at the UEs 115, and higher throughput.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for indicating beam switching capability as described herein, or the processor 1240 and the memory 1230 may be otherwise configured to perform or support such operations.

Figure 13:
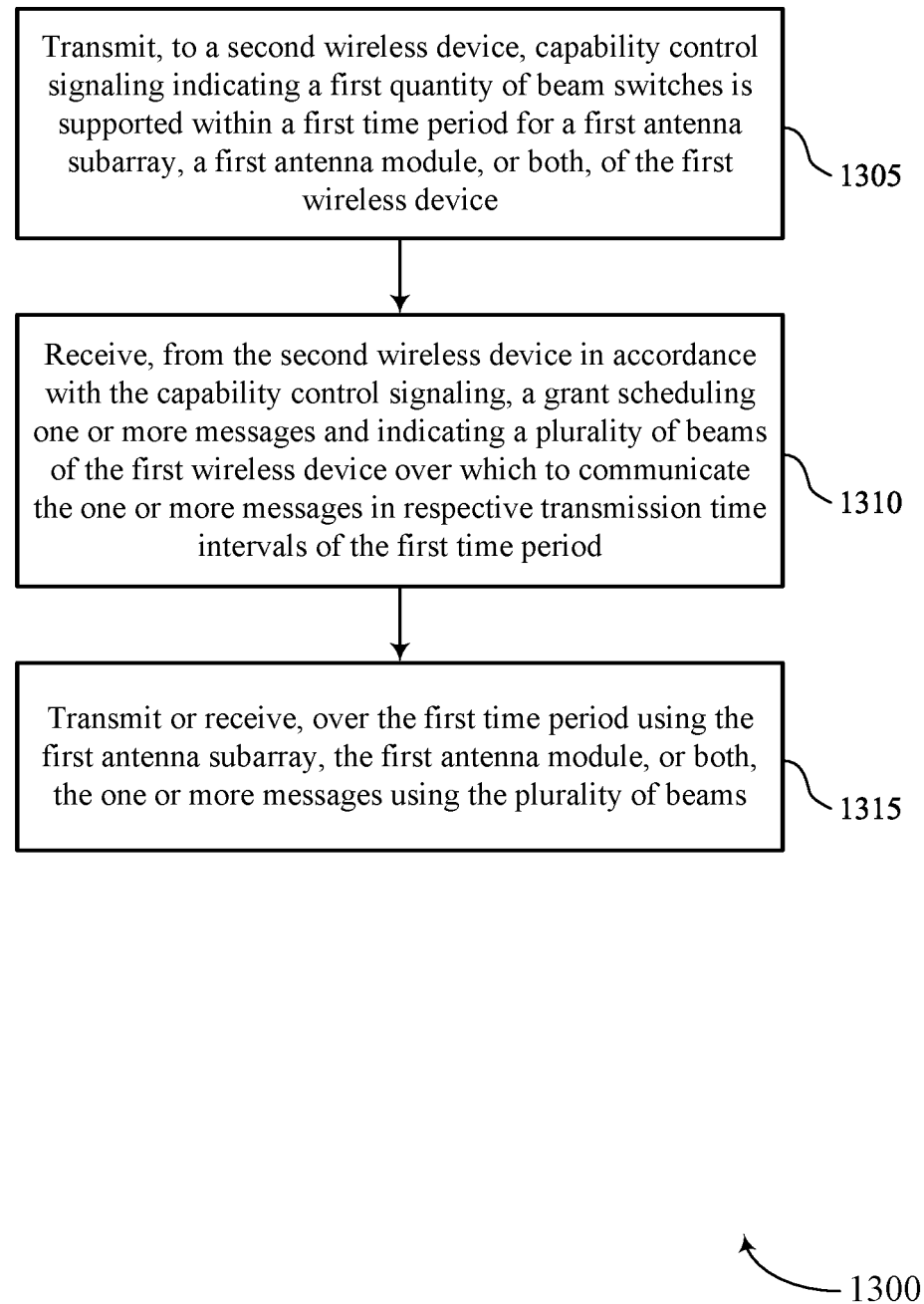
FIGS. 13 through 16 show flowcharts illustrating methods that support techniques for indicating beam switching capability in accordance with aspects of the present disclosure.

FIG. 13 shows a flowchart illustrating a method 1300 that supports techniques for indicating beam switching capability in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a second wireless device, capability control signaling indicating a first quantity of beam switches is supported within a first time period for a first antenna subarray, a first antenna module, or both, of the first wireless device. The operations of 1305 may be performed in accordance with examples as disclosed herein. In some examples, aspects of the operations of 1305 may be performed by a capability transmitting manager 725 as described with reference to FIG. 7.

At 1310, the method may include receiving, from the second wireless device in accordance with the capability control signaling, a grant scheduling one or more messages and indicating a set of multiple beams of the first wireless device over which to communicate the one or more messages in respective TTIs of the first time period. The operations of 1310 may be performed in accordance with examples as disclosed herein. In some examples, aspects of the operations of 1310 may be performed by a grant receiving manager 730 as described with reference to FIG. 7.

At 1315, the method may include transmitting or receiving, over the first time period using the first antenna subarray, the first antenna module, or both, the one or more messages using the set of multiple beams. The operations of 1315 may be performed in accordance with examples as disclosed herein. In some examples, aspects of the operations of 1315 may be performed by a beam communications manager 735 as described with reference to FIG. 7.

Figure 14:
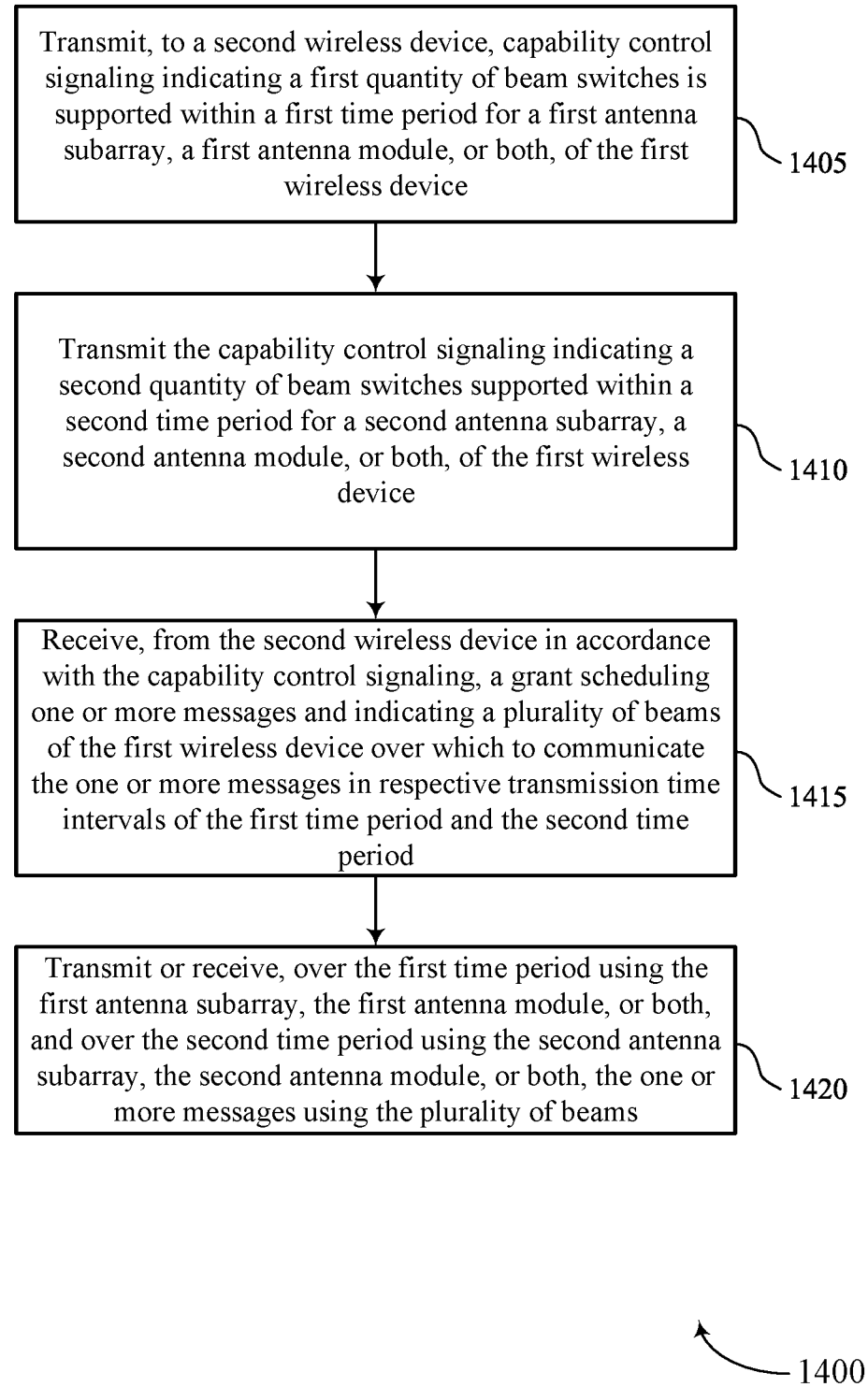

FIG. 14 shows a flowchart illustrating a method 1400 that supports techniques for indicating beam switching capability in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a second wireless device, capability control signaling indicating a first quantity of beam switches is supported within a first time period for a first antenna subarray, a first antenna module, or both, of the first wireless device. The operations of 1405 may be performed in accordance with examples as disclosed herein. In some examples, aspects of the operations of 1405 may be performed by a capability transmitting manager 725 as described with reference to FIG. 7.

At 1410, the method may include transmitting the capability control signaling indicating a second quantity of beam switches supported within a second time period for a second antenna subarray, a second antenna module, or both, of the first wireless device. The operations of 1410 may be performed in accordance with examples as disclosed herein. In some examples, aspects of the operations of 1410 may be performed by a capability transmitting manager 725 as described with reference to FIG. 7.

At 1415, the method may include receiving, from the second wireless device in accordance with the capability control signaling, a grant scheduling one or more messages and indicating a set of multiple beams of the first wireless device over which to communicate the one or more messages in respective TTIs of the first time period and the second time period. The operations of 1415 may be performed in accordance with examples as disclosed herein. In some examples, aspects of the operations of 1415 may be performed by a grant receiving manager 730 as described with reference to FIG. 7.

At 1420, the method may include transmitting or receiving, over the first time period using the first antenna subarray, the first antenna module, or both, and over the second time period using the second antenna subarray, the second antenna module, or both, the one or more messages using the set of multiple beams. The operations of 1420 may be performed in accordance with examples as disclosed herein. In some examples, aspects of the operations of 1420 may be performed by a beam communications manager 735 as described with reference to FIG. 7.

Figure 15:
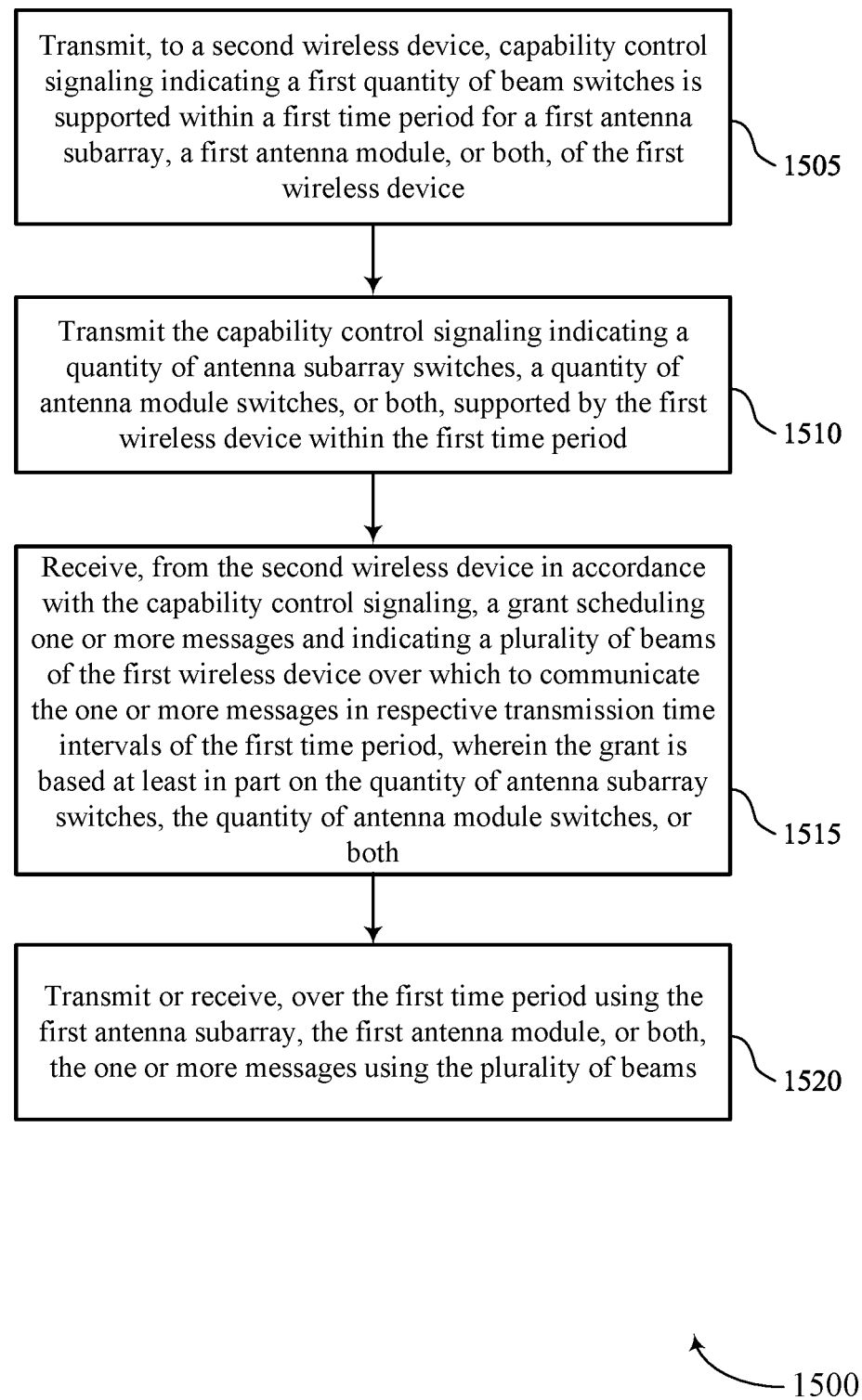

FIG. 15 shows a flowchart illustrating a method 1500 that supports techniques for indicating beam switching capability in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a second wireless device, capability control signaling indicating a first quantity of beam switches is supported within a first time period for a first antenna subarray, a first antenna module, or both, of the first wireless device. The operations of 1505 may be performed in accordance with examples as disclosed herein. In some examples, aspects of the operations of 1505 may be performed by a capability transmitting manager 725 as described with reference to FIG. 7.

At 1510, the method may include transmitting the capability control signaling indicating a quantity of antenna subarray switches, a quantity of antenna module switches, or both, supported by the first wireless device within the first time period. The operations of 1510 may be performed in accordance with examples as disclosed herein. In some examples, aspects of the operations of 1510 may be performed by a capability transmitting manager 725 as described with reference to FIG. 7.

At 1515, the method may include receiving, from the second wireless device in accordance with the capability control signaling, a grant scheduling one or more messages and indicating a set of multiple beams of the first wireless device over which to communicate the one or more messages in respective TTIs of the first time period, where the grant is based on the quantity of antenna subarray switches, the quantity of antenna module switches, or both. The operations of 1515 may be performed in accordance with examples as disclosed herein. In some examples, aspects of the operations of 1515 may be performed by a grant receiving manager 730 as described with reference to FIG. 7.

At 1520, the method may include transmitting or receiving, over the first time period using the first antenna subarray, the first antenna module, or both, the one or more messages using the set of multiple beams. The operations of 1520 may be performed in accordance with examples as disclosed herein. In some examples, aspects of the operations of 1520 may be performed by a beam communications manager 735 as described with reference to FIG. 7.

Figure 16:
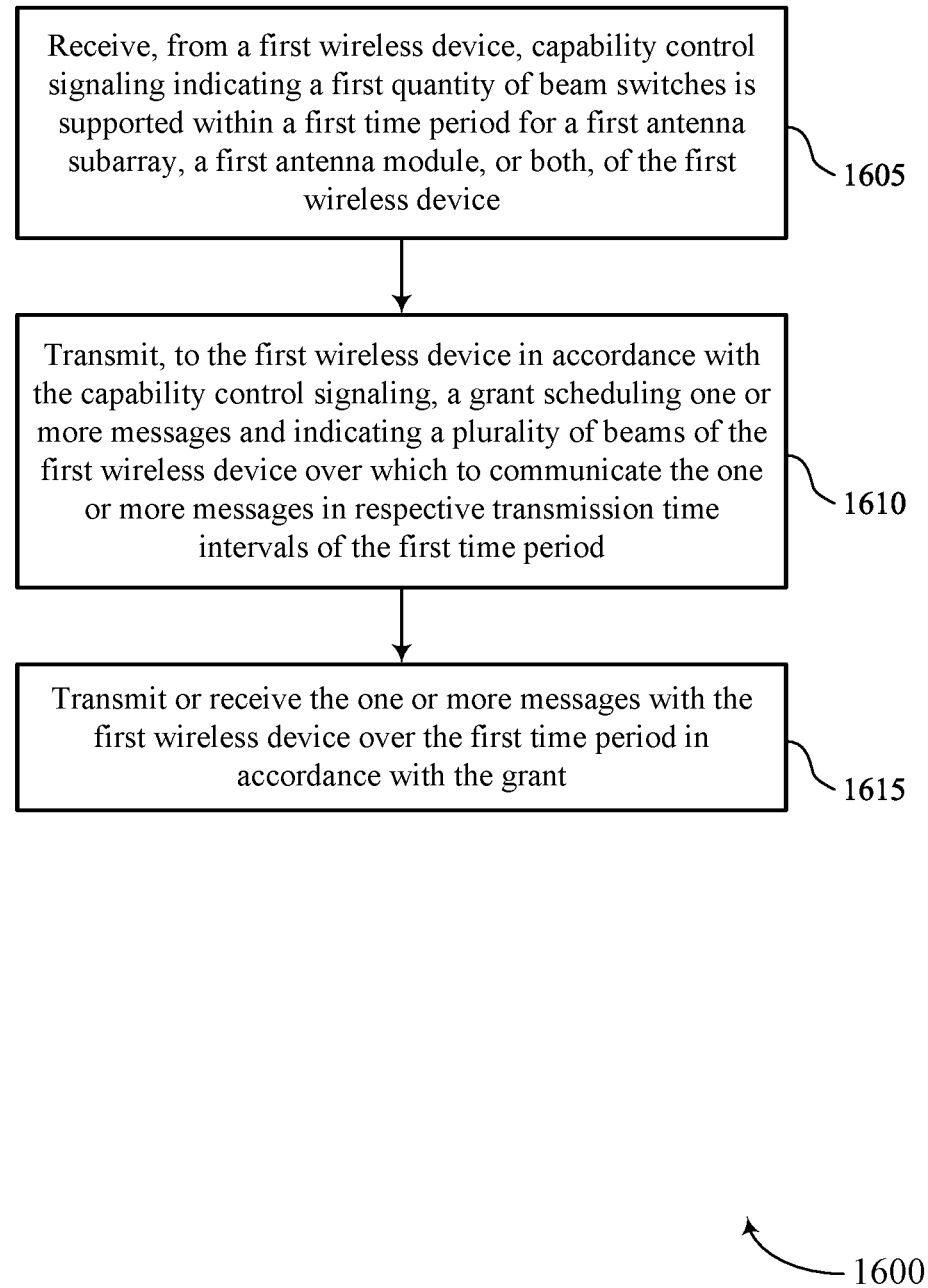

FIG. 16 shows a flowchart illustrating a method 1600 that supports techniques for indicating beam switching capability in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a first wireless device, capability control signaling indicating a first quantity of beam switches is supported within a first time period for a first antenna subarray, a first antenna module, or both, of the first wireless device. The operations of 1605 may be performed in accordance with examples as disclosed herein. In some examples, aspects of the operations of 1605 may be performed by a capability receiving manager 1125 as described with reference to FIG. 11.

At 1610, the method may include transmitting, to the first wireless device in accordance with the capability control signaling, a grant scheduling one or more messages and indicating a set of multiple beams of the first wireless device over which to communicate the one or more messages in respective TTIs of the first time period. The operations of 1610 may be performed in accordance with examples as disclosed herein. In some examples, aspects of the operations of 1610 may be performed by a grant transmitting manager 1130 as described with reference to FIG. 11.

At 1615, the method may include transmitting or receiving the one or more messages with the first wireless device over the first time period in accordance with the grant. The operations of 1615 may be performed in accordance with examples as disclosed herein. In some examples, aspects of the operations of 1615 may be performed by a beam communications manager 1135 as described with reference to FIG. 11.

The following provides an overview of aspects of the present disclosure:

Aspect 1: A method for wireless communication at a first wireless device, comprising: transmitting, to a second wireless device, capability control signaling indicating a first quantity of beam switches is supported within a first time period for a first antenna subarray, a first antenna module, or both, of the first wireless device; receiving, from the second wireless device in accordance with the capability control signaling, a grant scheduling one or more messages and indicating a plurality of beams of the first wireless device over which to communicate the one or more messages in respective transmission time intervals of the first time period; and transmitting or receiving, over the first time period using the first antenna subarray, the first antenna module, or both, the one or more messages using the plurality of beams.

Aspect 2: The method of aspect 1, wherein transmitting the capability control signaling further comprises: transmitting the capability control signaling indicating a second quantity of beam switches supported within a second time period for a second antenna subarray, a second antenna module, or both, of the first wireless device, wherein the grant schedules the one or more messages within the first time period and the second time period.

Aspect 3: The method of aspect 2, wherein transmitting or receiving the one or more messages comprises: transmitting or receiving a first subset of the one or more messages within the first time period using a first set of beams of the plurality of beams generated via the first antenna subarray, the first antenna module, or both; and transmitting or receiving a second subset of the one or more messages within the second time period using a second set of beams of the plurality of beams generated via the second antenna subarray, the second antenna module, or both.

Aspect 4: The method of aspect 3, wherein receiving the grant comprises: receiving the grant indicating the first set of beams, the second set of beams, or both.

Aspect 5: The method of any of aspects 1 through 4, wherein transmitting the capability control signaling further comprises: transmitting the capability control signaling indicating a quantity of antenna subarray switches, a quantity of antenna module switches, or both, supported by the first wireless device within the first time period, wherein the grant is based at least in part on the quantity of antenna subarray switches, the quantity of antenna module switches, or both.

Aspect 6: The method of any of aspects 1 through 5, wherein transmitting the capability control signaling further comprises: transmitting the capability control signaling indicating the first quantity of beam switches supported within the first time period for a plurality of antenna subarrays of the first wireless device, the plurality of antenna subarrays including the first antenna subarray.

Aspect 7: The method of aspect 6, wherein the plurality of antenna subarrays are associated with a single antenna module of the first wireless device, a plurality of antenna modules of the first wireless device, or both.

Aspect 8: The method of any of aspects 1 through 7, wherein transmitting the capability control signaling further comprises: transmitting the capability control signaling indicating the plurality of beams supported by the first quantity of beam switches within the first time period for the first antenna subarray, the first antenna module, or both.

Aspect 9: The method of aspect 8, wherein transmitting the capability control signaling further comprises: transmitting the capability control signaling indicating a second quantity of beams supported by a second quantity of beam switches within the first time period for the first antenna subarray, the first antenna module, or both.

Aspect 10: The method of any of aspects 8 through 9, wherein transmitting the capability control signaling further comprises: transmitting the capability control signaling indicating one or more beam switch permutations associated with the plurality of beams, wherein the grant schedules the one or more messages in accordance with the one or more beam switch permutations.

Aspect 11: The method of any of aspects 8 through 10, wherein transmitting the capability control signaling further comprises: transmitting the capability control signaling indicating one or more parameters associated with the plurality of beams including an angular distance between the plurality of beams, RF components associated with the plurality of beams, beamwidths associated with the plurality of beams, a quantity of antenna elements associated with the plurality of beams, or any combination thereof, wherein the grant schedules the one or more messages in accordance with the one or more parameters.

Aspect 12: The method of any of aspects 1 through 11, wherein the first wireless device comprises a plurality of antenna modules including the first antenna module, each antenna module comprises a plurality of antenna subarrays, and each antenna subarray comprises one or more antenna elements.

Aspect 13: The method of any of aspects 1 through 12, wherein the capability control signaling comprises L1 signaling, L2 signaling, RRC signaling, or any combination thereof.

Aspect 14: The method of any of aspects 1 through 13, wherein the first wireless device comprises one of a UE, a CPE, or a first IAB node, and wherein the second wireless device comprises one of a base station or a second IAB node.

Aspect 15: A method for wireless communication at a second wireless device, comprising: receiving, from a first wireless device, capability control signaling indicating a first quantity of beam switches is supported within a first time period for a first antenna subarray, a first antenna module, or both, of the first wireless device; transmitting, to the first wireless device in accordance with the capability control signaling, a grant scheduling one or more messages and indicating a plurality of beams of the first wireless device over which to communicate the one or more messages in respective transmission time intervals of the first time period; and transmitting or receiving the one or more messages with the first wireless device over the first time period in accordance with the grant.

Aspect 16: The method of aspect 15, wherein receiving the capability control signaling further comprises: receiving the capability control signaling indicating a second quantity of beam switches supported within a second time period for a second antenna subarray, a second antenna module, or both, of the first wireless device, wherein the grant schedules the one or more messages within the first time period and the second time period.

Aspect 17: The method of aspect 16, wherein transmitting or receiving the one or more messages comprises: transmitting or receiving a first subset of the one or more messages within the first time period based at least in part on a first set of beams of the plurality of beams generated by the first wireless device via the first antenna subarray, the first antenna module, or both; and transmitting or receiving a second subset of the one or more messages within the second time period based at least in part on a second set of beams of the plurality of beams generated by the first wireless device via the second antenna subarray, the second antenna module, or both.

Aspect 18: The method of aspect 17, wherein transmitting the grant comprises: transmitting the grant indicating the first set of beams, the second set of beams, or both.

Aspect 19: The method of any of aspects 15 through 18, wherein receiving the capability control signaling further comprises: receiving the capability control signaling indicating a quantity of antenna subarray switches, a quantity of antenna module switches, or both, supported by the first wireless device within the first time period, wherein the grant is based at least in part on the quantity of antenna subarray switches, the quantity of antenna module switches, or both.

Aspect 20: The method of any of aspects 15 through 19, wherein receiving the capability control signaling further comprises: receiving the capability control signaling indicating the first quantity of beam switches supported within the first time period for a plurality of antenna subarrays of the first wireless device, the plurality of antenna subarrays including the first antenna subarray.

Aspect 21: The method of aspect 20, wherein the plurality of antenna subarrays are associated with a single antenna module of the first wireless device, a plurality of antenna modules of the first wireless device, or both.

Aspect 22: The method of any of aspects 15 through 21, wherein receiving the capability control signaling further comprises: receiving the capability control signaling indicating the plurality of beams supported by the first quantity of beam switches within the first time period for the first antenna subarray, the first antenna module, or both.

Aspect 23: The method of aspect 22, wherein receiving the capability control signaling further comprises: receiving the capability control signaling indicating a second quantity of beams supported by a second quantity of beam switches within the first time period for the first antenna subarray, the first antenna module, or both.

Aspect 24: The method of any of aspects 22 through 23, wherein receiving the capability control signaling further comprises: receiving the capability control signaling indicating one or more beam switch permutations associated with the plurality of beams, wherein the grant schedules the one or more messages in accordance with the one or more beam switch permutations.

Aspect 25: The method of any of aspects 22 through 24, wherein receiving the capability control signaling further comprises: receiving the capability control signaling indicating one or more parameters associated with the plurality of beams including an angular distance between the plurality of beams, RF components associated with the plurality of beams, beamwidths associated with the plurality of beams, a quantity of antenna elements associated with the plurality of beams, or any combination thereof, wherein the grant schedules the one or more messages in accordance with the one or more parameters.

Aspect 26: The method of any of aspects 15 through 25, wherein the first wireless device comprises a plurality of antenna modules including the first antenna module, each antenna module comprises a plurality of antenna subarrays, and each antenna subarray comprises one or more antenna elements.

Aspect 27: The method of any of aspects 15 through 26, wherein the capability control signaling comprises L1 signaling, L2 signaling, RRC signaling, or any combination thereof.

Aspect 28: The method of any of aspects 15 through 27, wherein the first wireless device comprises one of a UE, a CPE, or a first IAB node, and wherein the second wireless device comprises one of a base station or a second IAB node Aspect 29: An apparatus for wireless communication at a first wireless device, comprising a processor; memory coupled with the processor; and instructions stored in the memory and executable by the processor to cause the apparatus to perform a method of any of aspects 1 through 14.

Aspect 30: An apparatus for wireless communication at a first wireless device, comprising at least one means for performing a method of any of aspects 1 through 14.

Aspect 31: A non-transitory computer-readable medium storing code for wireless communication at a first wireless device, the code comprising instructions executable by a processor to perform a method of any of aspects 1 through 14.

Aspect 32: An apparatus for wireless communication at a second wireless device, comprising a processor; memory coupled with the processor; and instructions stored in the memory and executable by the processor to cause the apparatus to perform a method of any of aspects 15 through 28.

Aspect 33: An apparatus for wireless communication at a second wireless device, comprising at least one means for performing a method of any of aspects 15 through 28.

Aspect 34: A non-transitory computer-readable medium storing code for wireless communication at a second wireless device, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   transmitting, to a second wireless device, capability control signaling indicating a first quantity of beam switches is supported within a first time period for a first antenna subarray, a first antenna module, or both, of the first wireless device;
   receiving, from the second wireless device in accordance with the capability control signaling, a grant scheduling one or more messages and indicating a plurality of beams of the first wireless device over which to communicate the one or more messages in respective transmission time intervals of the first time period; and
   transmitting or receiving, over the first time period using the first antenna subarray, the first antenna module, or both, the one or more messages using the plurality of beams.

2. The method of claim 1, wherein transmitting the capability control signaling further comprises:
   transmitting the capability control signaling indicating a second quantity of beam switches supported within a second time period for a second antenna subarray, a second antenna module, or both, of the first wireless device, wherein the grant schedules the one or more messages within the first time period and the second time period.

3. The method of claim 2, wherein transmitting or receiving the one or more messages comprises:
   transmitting or receiving a first subset of the one or more messages within the first time period using a first set of beams of the plurality of beams generated via the first antenna subarray, the first antenna module, or both; and
   transmitting or receiving a second subset of the one or more messages within the second time period using a second set of beams of the plurality of beams generated via the second antenna subarray, the second antenna module, or both.

4. The method of claim 3, wherein receiving the grant comprises:
   receiving the grant indicating the first set of beams, the second set of beams, or both.

5. The method of claim 1, wherein transmitting the capability control signaling further comprises:
   transmitting the capability control signaling indicating a quantity of antenna subarray switches, a quantity of antenna module switches, or both, supported by the first wireless device within the first time period, wherein the grant is based at least in part on the quantity of antenna subarray switches, the quantity of antenna module switches, or both.

6. The method of claim 1, wherein transmitting the capability control signaling further comprises:
   transmitting the capability control signaling indicating the first quantity of beam switches supported within the first time period for a plurality of antenna subarrays of the first wireless device, the plurality of antenna subarrays including the first antenna subarray.

7. The method of claim 6, wherein the plurality of antenna subarrays are associated with a single antenna module of the first wireless device, a plurality of antenna modules of the first wireless device, or both.

8. The method of claim 1, wherein transmitting the capability control signaling further comprises:
   transmitting the capability control signaling indicating the plurality of beams supported by the first quantity of beam switches within the first time period for the first antenna subarray, the first antenna module, or both.

9. The method of claim 8, wherein transmitting the capability control signaling further comprises:
   transmitting the capability control signaling indicating a second quantity of beams supported by a second quantity of beam switches within the first time period for the first antenna subarray, the first antenna module, or both.

10. The method of claim 8, wherein transmitting the capability control signaling further comprises:
    transmitting the capability control signaling indicating one or more beam switch permutations associated with the plurality of beams, wherein the grant schedules the one or more messages in accordance with the one or more beam switch permutations.

11. The method of claim 8, wherein transmitting the capability control signaling further comprises:
    transmitting the capability control signaling indicating one or more parameters associated with the plurality of beams including an angular distance between the plurality of beams, radio frequency components associated with the plurality of beams, beamwidths associated with the plurality of beams, a quantity of antenna elements associated with the plurality of beams, or any combination thereof, wherein the grant schedules the one or more messages in accordance with the one or more parameters.

12. The method of claim 1, wherein the first wireless device comprises a plurality of antenna modules including the first antenna module, wherein each antenna module comprises a plurality of antenna subarrays, and wherein each antenna subarray comprises one or more antenna elements.

13. The method of claim 1, wherein the capability control signaling comprises Layer 1 signaling, Layer 2 signaling, radio resource control signaling, or any combination thereof.

14. The method of claim 1,
    wherein the first wireless device comprises one of a user equipment (UE), a customer premises equipment, or a first integrated access and backhaul (IAB) node, and wherein the second wireless device comprises one of a base station or a second IAB node.

15. A method for wireless communication at a second wireless device, comprising:
receiving, from a first wireless device, capability control signaling indicating a first quantity of beam switches is supported within a first time period for a first antenna subarray, a first antenna module, or both, of the first wireless device;
transmitting, to the first wireless device in accordance with the capability control signaling, a grant scheduling one or more messages and indicating a plurality of beams of the first wireless device over which to communicate the one or more messages in respective transmission time intervals of the first time period; and
transmitting or receiving the one or more messages with the first wireless device over the first time period in accordance with the grant.

16. The method of claim 15, wherein receiving the capability control signaling further comprises:
receiving the capability control signaling indicating a second quantity of beam switches supported within a second time period for a second antenna subarray, a second antenna module, or both, of the first wireless device, wherein the grant schedules the one or more messages within the first time period and the second time period.

17. The method of claim 16, wherein transmitting or receiving the one or more messages comprises:
transmitting or receiving a first subset of the one or more messages within the first time period based at least in part on a first set of beams of the plurality of beams generated by the first wireless device via the first antenna subarray, the first antenna module, or both; and
transmitting or receiving a second subset of the one or more messages within the second time period based at least in part on a second set of beams of the plurality of beams generated by the first wireless device via the second antenna subarray, the second antenna module, or both.

18. The method of claim 17, wherein transmitting the grant comprises:
transmitting the grant indicating the first set of beams, the second set of beams, or both.

19. The method of claim 15, wherein receiving the capability control signaling further comprises:
receiving the capability control signaling indicating a quantity of antenna subarray switches, a quantity of antenna module switches, or both, supported by the first wireless device within the first time period, wherein the grant is based at least in part on the quantity of antenna subarray switches, the quantity of antenna module switches, or both.

20. The method of claim 15, wherein receiving the capability control signaling further comprises:
receiving the capability control signaling indicating the first quantity of beam switches supported within the first time period for a plurality of antenna subarrays of the first wireless device, the plurality of antenna subarrays including the first antenna subarray.

21. The method of claim 20, wherein the plurality of antenna subarrays are associated with a single antenna module of the first wireless device, a plurality of antenna modules of the first wireless device, or both.

22. The method of claim 15, wherein receiving the capability control signaling further comprises:
receiving the capability control signaling indicating the plurality of beams supported by the first quantity of beam switches within the first time period for the first antenna subarray, the first antenna module, or both.

23. The method of claim 22, wherein receiving the capability control signaling further comprises:
receiving the capability control signaling indicating a second quantity of beams supported by a second quantity of beam switches within the first time period for the first antenna subarray, the first antenna module, or both.

24. The method of claim 22, wherein receiving the capability control signaling further comprises:
receiving the capability control signaling indicating one or more beam switch permutations associated with the plurality of beams, wherein the grant schedules the one or more messages in accordance with the one or more beam switch permutations.

25. The method of claim 22, wherein receiving the capability control signaling further comprises:
receiving the capability control signaling indicating one or more parameters associated with the plurality of beams including an angular distance between the plurality of beams, radio frequency components associated with the plurality of beams, beamwidths associated with the plurality of beams, a quantity of antenna elements associated with the plurality of beams, or any combination thereof, wherein the grant schedules the one or more messages in accordance with the one or more parameters.

26. The method of claim 15, wherein the first wireless device comprises a plurality of antenna modules including the first antenna module, wherein each antenna module comprises a plurality of antenna subarrays, and wherein each antenna subarray comprises one or more antenna elements.

27. The method of claim 15, wherein the capability control signaling comprises Layer 1 signaling, Layer 2 signaling, radio resource control signaling, or any combination thereof.

28. The method of claim 15,
wherein the first wireless device comprises one of a user equipment (UE), a customer premises equipment, or a first integrated access and backhaul (IAB) node, and
wherein the second wireless device comprises one of a base station or a second IAB node.

29. An apparatus for wireless communication at a first wireless device, comprising:
a processor;
memory coupled with the processor; and
instructions stored in the memory and executable by the processor to cause the apparatus to:
transmit, to a second wireless device, capability control signaling indicating a first quantity of beam switches is supported within a first time period for a first antenna subarray, a first antenna module, or both, of the first wireless device;
receive, from the second wireless device in accordance with the capability control signaling, a grant scheduling one or more messages and indicating a plurality of beams of the first wireless device over which to communicate the one or more messages in respective transmission time intervals of the first time period; and
transmit or receive, over the first time period using the first antenna subarray, the first antenna module, or both, the one or more messages using the plurality of beams.

30. An apparatus for wireless communication at a second wireless device, comprising:
- a processor;
- memory coupled with the processor; and
- instructions stored in the memory and executable by the processor to cause the apparatus to:
  - receive, from a first wireless device, capability control signaling indicating a first quantity of beam switches is supported within a first time period for a first antenna subarray, a first antenna module, or both, of the first wireless device;
  - transmit, to the first wireless device in accordance with the capability control signaling, a grant scheduling one or more messages and indicating a plurality of beams of the first wireless device over which to communicate the one or more messages in respective transmission time intervals of the first time period; and
  - transmit or receive the one or more messages with the first wireless device over the first time period in accordance with the grant.

* * * * *